United States Patent [19]
Cook et al.

[11] Patent Number: 5,798,943
[45] Date of Patent: Aug. 25, 1998

[54] APPARATUS AND PROCESS FOR A DIGITAL SWATCHBOOK

[75] Inventors: Robert L. Cook, San Anselmo; Eric M. Herrmann, Larkspur; Nelson Offner, Kensington, all of Calif.; Edward M. Granger, Rochester, N.Y.; Akin Dirik; Lawrence D. Baca, both of San Francisco, Calif.

[73] Assignee: Light Source Computer Images, San Rafael, Calif.

[21] Appl. No.: 826,031

[22] Filed: Mar. 28, 1997

Related U.S. Application Data

[63] Continuation of Ser. No. 408,005, Mar. 21, 1995, Pat. No. 5,680,327.

[51] Int. Cl.⁶ .................. G01J 3/46; G01J 3/52; G06F 17/00
[52] U.S. Cl. .................. 364/526; 356/405; 382/126
[58] Field of Search .................. 356/326, 405, 356/408; 364/526; 382/162

[56] References Cited

U.S. PATENT DOCUMENTS

| | | | |
|---|---|---|---|
| 2,774,276 | 12/1956 | Glasser et al. | 356/405 |
| 3,159,742 | 12/1964 | Davidson | 364/526 |
| 3,504,980 | 4/1970 | Bentley et al. | 356/405 |
| 4,110,826 | 8/1978 | Möllgaard et al. | 364/526 |
| 4,414,635 | 11/1983 | Gast et al. | 364/526 |
| 4,954,972 | 9/1990 | Sullivan | 364/526 |
| 5,221,959 | 6/1993 | Ohyama et al. | 356/326 |
| 5,311,212 | 5/1994 | Beretta | 345/150 |
| 5,412,766 | 5/1995 | Pietras et al. | 395/131 |
| 5,432,906 | 7/1995 | Newman et al. | 395/501 |
| 5,459,530 | 10/1995 | Andersson et al. | 348/645 |
| 5,680,327 | 10/1997 | Cook et al. | 364/526 |
| 5,696,839 | 12/1997 | Siegeritz | 382/162 |

*Primary Examiner*—Edward R. Cosimano
*Attorney, Agent, or Firm*—David G. Beck; Townsend and Townsend and Crew

[57] ABSTRACT

The present invention provides a method and apparatus for accurately matching colors. The color matching system includes a host computer and a color input device in communication with the host computer. Preferably the color input device is capable of obtaining spectral data, such as that obtained using a spectrophotometer. The host computer includes a color library, a color management system, a monitor, and a user interface. In one aspect of the invention, the user selects a target color, a color library to use for matching, a color distance tolerance, and a light source under which the colors are to be matched. The target color is compared to the colors in the library and the color or colors in the library that are within the specified color tolerance are reported. In a second aspect of the invention, the user selects a color and two illuminants. The color under each of the two illuminants is compared and the color distance between the two is reported. In a third aspect of the invention, a selected color is transformed to the color space of a designated printer and then back-transformed to the color space of the monitor and displayed. The displayed color represents a simulation of the selected color as it would appear if printed.

24 Claims, 3 Drawing Sheets

APPARATUS AND PROCESS FOR A DIGITAL SWATCHBOOK

This application is a Continuation of application Ser. No. 08/408,005, filed Mar. 21, 1995, now U.S. Pat. No. 5,680,327.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to digital color systems, and more specifically to techniques for precisely matching a target color with a color chosen from a library of colors and determining the accuracy of the match.

Many endeavors, such as the print and graphics arts, require a means for determining and then specifying a desired color. Traditionally designers and graphic artists have used a swatchbook, a swatchbook simply being a set of standard colors. The user holds the swatchbook next to an example of the desired color and visually determines the color in the swatchbook which is closest to the desired color. The index or name of the color in the swatchbook is then used to specify the desired color.

Unfortunately, swatchbook users are frequently dissatisfied, primarily due to unsatisfactory color matching. There are a number of reasons why the use of swatchbooks often result in mismatches. First, there is tremendous variability in the representation of a given color from swatchbook to swatchbook. This variability is a product of differences in the printing processes used to produce the individual swatchbooks as well as each book's age and general condition. Second, by its very nature the matching process is imprecise and subjective. Therefore what is a satisfactory match to one person may appear to be a completely unsatisfactory match to another person. Third, the lighting conditions can dramatically affect the results of a match. For example, an excellent match under incandescent lighting may appear to be a terrible match under fluorescent lighting. Swatchbooks suffer from a number of other deficiencies which, although not directly affecting accuracy, limit their usefulness. Comparing the colors in a swatchbook to a sample color is quite time consuming, especially if it is necessary to search through several different swatchbooks. Once several "close" matches have been found, it is not easy to simultaneously compare these matches without taking apart the swatchbooks so that side-by-side comparisons can be made. Furthermore, attempting to determine the best match among several close matches is still subjective since there is no simple way to gauge the accuracy of each match. Finally, assuming that the desired color is to be printed on some form of electronic printer, the chosen printer may not be able to accurately reproduce the chosen color. Unfortunately the only way to determine the match between the desired color and the printed color is quite time-consuming, requiring that the printed color be visually compared to the desired color.

From the above it is seen that an improved method and apparatus for performing color matching is desired, especially one which combines accuracy and precision with ease of use.

SUMMARY

The present invention provides a method and apparatus for accurately matching colors taking into account both lighting conditions and device limitations.

According to one aspect of the invention, a color matching system includes a host computer and a color input device in communication with the host computer. Preferably the color input device is capable of obtaining spectral data, such as that obtained using a spectrophotometer. The host computer includes a color library, a monitor, a user interface (e.g., keyboard or mouse), and preferably a printing device.

In a specific embodiment, a user inputs a target color to be matched using the color input device. The user also specifies the lighting source, the color space, the color libraries to be searched, and the allowable difference (i.e., color tolerance) between the target color and any potential color matches. The color tolerance is specified in terms of the computed distance between two colors in the designated color space. The system converts the spectral data for the target color and all of the colors in the selected color library to CIE XYZ and then to the designated color space. The conversion is done relative to the selected lighting source. The converted color library is then searched for matches by computing the color difference from the target color, and comparing this difference to the specified color tolerance. The list of matches is sorted according to their closeness to the target color and displayed to the user.

In another embodiment, the user inputs spectral data for a selected color into the system. The spectral data can either be obtained using the color input device or from one of the libraries. The system converts the spectral data into intensity profiles for each of the illuminants. The system displays the selected color as it would appear under each of the illuminants as well as indicating the distance between the two colors in a user-designated color space.

A further understanding of the nature and advantages of the present invention may be realized by reference to the remaining portions of the specification and the drawings. NOTE: The name "PANTONE" may or may not be a trademark/servicemark of another.

DESCRIPTION OF SPECIFIC EMBODIMENTS

Overview

Figure 1:
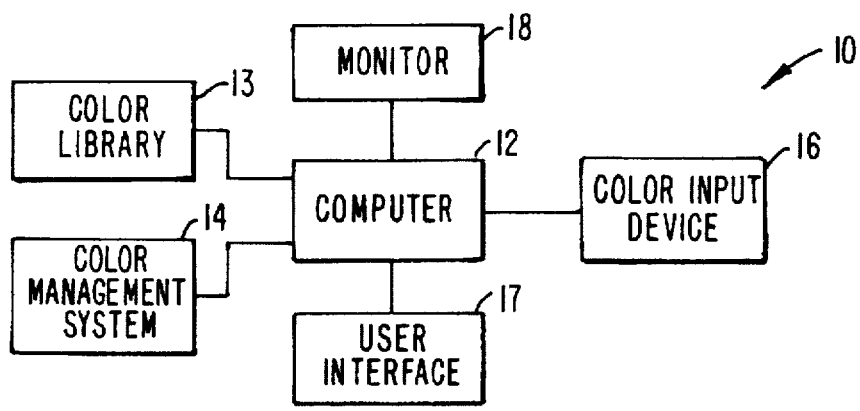
FIG. 1 is a functional diagram of a color matching apparatus according to the present invention.

FIG. 1 is a functional diagram of a color matching apparatus 10 according to the present invention. A host computer 12 containing a color library 13 and a color management system 14 performs the matching procedures. Color library 13 is comprised of one or more color palettes. Individual color palettes may include standardized color sets as well as custom user palettes. The desired or target color is input using a color input device 16. The user controls the system through a user interface 17, a combination keyboard and mouse in the preferred embodiment. Through interface 17 the user selects features such as which of the color palettes contained in color library 13 are to be used for matching, the desired accuracy of the match, and the light source under which the match is to be performed. The results of the match are communicated to the user, preferably through a monitor 18.

Color Input Device

In order to accurately match colors, the preferred embodiment of the present invention utilizes a spectrophotometer as color input device 16. There are a variety of spectrophotometers which can be used to measure the spectral data of a target material, such as the hand-held spectrophotometer claimed and described in co-pending U.S. application Ser. No. 08/907,769 filed Aug. 8, 1997, currently pending, entitled DIGITAL COLOR MEASUREMENT SYSTEM, assigned to the common assignee herein and incorporated herein by reference for all purposes.

Figure 2:
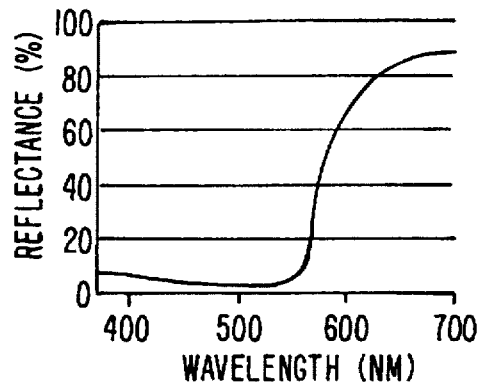
FIG. 2 is a plot of the reflectance of a red object.

FIG. 2 is a plot of the reflectance of a red object. To obtain this plot a spectrophotometer was used to measure the intensity of the reflected light at each wavelength as a percentage of the incoming light. Thus this plot is a function of the reflectance characteristics of the object as well as the intensity spectrum of the source of the incoming light.

Although an accurate description of the color of an object must take into account the spectral contributions at each wavelength within the visible spectrum, most common descriptions of a color rely on a triplet of colors to represent the color in question. Color spaces based on three color systems are traditionally referred to as tristimulus color spaces. A few of the more common tristimulus color spaces are listed below.

RGB (Red Green Blue)—One of the most common tristimulus color systems is the RGB system which describes color on the basis of three additive primaries: red, green, and blue. The RGB system is commonly used to represent colors on computer peripherals such as monitors, scanners, and digital cameras. For example, in a computer monitor different colors are simulated by varying the intensity of glowing red, green, and blue phosphors on the monitor's CRT face. Conversely, scanners imitate color vision by measuring the intensities of red, green, and blue light reflected from a scanned object.

CMY (Cyan Magenta Yellow)—The CMY tristimulus color system is based on the three subtractive primaries; cyan, magenta, and yellow. This system starts with white and subtracts different quantities of red, green, and blue to obtain any desired color. For example, in color printing if the user wishes to subtract red from a white page, a filtering pigment which allows all colors to pass through it except red is applied to the page.

CMYK (Cyan Magenta Yellow Black)—The CMYK system is commonly used for full color printing. As with the CMY system briefly described above, this system is based on the use of red, green, and blue filters (i.e., cyan, magenta, and yellow inks, respectively) to filter different wavelengths from the white reflected by the paper. Ideally, black should result when 100 percent each of cyan, magenta, and yellow ink are combined. However, since commercial inks and papers are not ideal, this combination of inks will not yield a pure black. Therefore, to obtain better blacks and grays, most color printers resort to four color printing in which black ("K") is added to the CMY system.

HSB (Hue Saturation Brightness)—The HSB color system is common to many computer applications because it is more intuitive than either the CMY or RGB systems. Rather than describing an individual color as a combination of other colors (primaries), the properties of the colors are used. Brightness is the property of a color by which it appears to contain more or less light. Saturation is the degree to which a color appears to be pure, containing neither white nor gray. Unsaturated colors appear to be diluted with quantities of neutral grays. Hue is the property of a pure color which distinguishes it from other pure colors, and thus the property that gives a color its principal name (e.g., red, green, yellow, blue-green, etc.). Thus hue is directly associated with wavelength.

CIE XYZ—This color space was designed by the Commission Internationale de l'Éclairage (CIE) to address some of the device-related problems associated with the color systems described above. The CIE XYZ color space defines all colors in terms of three imaginary primaries X, Y, and Z based on a hypothetical human observer known as the Standard Observer. The visual characteristics of the Standard Observer are based on many human test subjects doing color-matching experiments under controlled viewing and lighting conditions. The CIE XYZ system is rarely used directly, but instead is used as an intermediate step in the conversion from spectral data to all other tristimulus color spaces. The groups X, Y, and Z work like the additive primaries RGB, i.e., every color can be expressed as mixture of the quantities of X, Y, and Z.

Spectral data can be converted to CIE XYZ using the following equations:

$$X = k \int S(\lambda) a(\lambda) \beta(\lambda) d\lambda$$

$$Y = k \int S(\lambda) b(\lambda) \beta(\lambda) d\lambda$$

$$Z = k \int S(\lambda) c(\lambda) \beta(\lambda) d\lambda$$

where:

$\lambda$=wavelength $k = 100 / [\int S(\lambda) b(\lambda) d\lambda]$ $\beta(\lambda)$=the spectral reflectance of the sample at wavelength $\lambda$. For transmissive samples, substitute the spectral transmittance $\tau(\lambda)$;

$S(\lambda)$=the relative power of the illuminant at wavelength $\lambda$; and $a(\lambda)$, $b(\lambda)$, $c(\lambda)$ are the color-matching functions for the CIE 1931 2° and/or 10° Standard Observer. When computing tristimulus values from actual spectrophotometric measurements, the integrals are replaced by sums.

CIE xyY—This color space is derived directly from XYZ and is used to graph colors in two dimensions independent of lightness. The value Y is identical to the tristimulus value Y in XYZ and represents the luminance, or lightness, of the color. The x and y values are called the chromaticity coordinates of the color and are computed directly from the tristimulus values XYZ. The values are defined as:

$$x = X/(X+Y+Z) \text{ and } y = Y/(X+Y+Z).$$

CIE Lab and CIE Luv—These two color spaces are the result of attempts to create a perceptually uniform color system, one in which the distance between any two colors in the color space corresponds to the perceived 'closeness' of the two colors. L represents a uniform lightness scale which is derived from Y. The new chromaticity coordinates u, v, a, and b are derived from x and y. The general relationships between these different color spaces are given by the following equations:

$$L=116(Y/Y_n)^{1/3}-16$$

$$u=13L(u'-u_{n'})$$

$$v=13L(v'-v_{n'})$$

$$a=500[(X/X_n)^{1/3}-(Y/Y_n)^{1/3}]$$

$$b=200[(Y/Y_n)^{1/3}-(Z/Z_n)^{1/3}]$$

where:

$u'=4X/(X+15Y+3Z)$ $v'=9Y/(X+15Y+3Z)$ $u_n=4X_n/(X_n+15Y_n+3Z_n)$ $v_n=9Y_n/(X_n+15Y_n+3Z_n)$

The values $X_n$, $Y_n$, $Z_n$ are the CIE tristimulus values for the perfect reflecting or transmitting diffuser. It should be noted that at very low light values, the above relationships are slightly modified.

To summarize the color spaces discussed above, all tristimulus values can be computed from CIE XYZ, which in turn can be computed from spectral data as long the observer and the illuminant are specified.

Color Management System

A further source of ambiguity when specifying a color arises due to the dependence of color on the device used to either display or reproduce the desired color. The device dependence of color occurs for a variety of reasons. First, even supposedly equivalent devices may vary greatly from manufacturer to manufacturer due to differences in design, manufacturing processes, raw materials, and processing tolerances. Second, the same model of device made by a single manufacturer can vary from unit to unit, this effect primarily due to manufacturing tolerances. Third, even the performance of a single device may vary as it ages or under different operating conditions (e.g., temperature or humidity effects).

For the above reasons, any RGB, HSB, CMY, or CMYK definition of a color must include a specification of the device for which these values were intended. In other words, an RGB specification which produces the desired color on one monitor may not yield the desired color on a different monitor, solely due to device differences. For this reason, RGB, HSB, CMY, and CMYK are known as device dependent color spaces. The CIE color spaces are device independent color spaces since the XYZ values for a color do not vary depending on the device used to reproduce the color. This is because the CIE color spaces are based on the definition of a master device, the Standard Observer.

Figure 3:
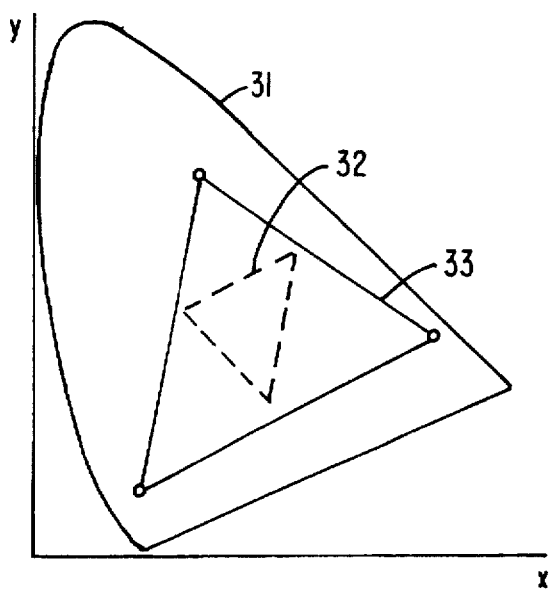
FIG. 3 illustrates the problem of gamut mapping.

The gamut of a device is the range of colors that it can reproduce (in the case of a monitor or printer) or distinguish (in the case of a scanner or other detection device). FIG. 3 illustrates the problem of gamut mapping, converting color coordinates from one device's color space to another. Graph 31 is a CIE chromaticity diagram in which the xy values of the CIE xyY color space are plotted. Graph 33 is the range of displayable colors in a typical computer monitor, illustrating that there are many colors which the human eye can distinguish which simply cannot be conveyed on a computer monitor. Graph 32 illustrates the case where the gamut of a CMYK-based printer is even smaller than that of a computer monitor. Thus, in this case there are colors that can be displayed on the monitor that simply cannot be duplicated on the printer. Typically, there are some colors in the gamut of a monitor which fall outside the gamut of a printer and conversely, there are some colors in the gamut of a printer which fall outside the gamut of a monitor.

A color management system ("CMS") is an internal system which properly converts colors from one device to another. Within the CMS is a master color space. This is the color space used to transport colors from the input (e.g., a scanner) through the software (e.g., image manipulation and page layout applications) to display (e.g., monitor) and output (e.g., printer). Preferably, the master color space is a device independent color space such as CIE XYZ. A practical problem associated with using CIE XYZ as the color space is that every time that an image or color is displayed to the monitor, it must first be converted from XYZ to RGB. This would considerably slow down the redraw speed of the screen. Therefore many color management systems transport colors in a color space known as monitor RGB, the RGB color space of the monitor. Under this CMS, no conversion is needed when displaying images or colors, only when printing.

The key ingredients of a CMS are device profiles. A device profile specifies the transformation from one device color space to another, usually the conversion to and from the master color space. For example, a scanner profile converts color from the RGB color space of a scanner to the master color space and a printer profile converts color from the master color space to the printer's CMYK space.

The greatest difficulty in developing a CMS is that by its very nature a CMS requires the cooperation between a large number of components all made by different manufacturers. Input devices and software (e.g., scanning systems) must know how to apply an input profile to convert the RGB values produced by the input hardware to the master color space of the CMS. Every piece of software that lets the user edit or specify colors on screen (e.g., image manipulation, paint, draw, and page-layout programs) must know how to convert colors to and from the monitor RGB space. Every component involved in the printing of color (e.g., page-layout programs, print drivers) must know when color must be converted, where to find the appropriate printer profiles on the system, and how to use them. For these reasons, no one manufacturer is in a position of producing the comprehensive CMS to handle all situations.

Another difficulty associated with the development of a CMS is the gamut problem discussed above. It is impossible to provide a system in which the final printed product is the same as what is shown on the monitor if the monitor is capable of colors which the printer simply cannot print. An obvious solution is to limit the monitor to the same color space as that of the printer. Many users are unwilling to artificially limit their monitor's color space and therefore find this to be an unsatisfactory solution.

Illuminant Dependence—Although the CIE color spaces address the problem of device dependence, they do not solve the problem inherent with all tristimulus colors: illuminant dependence. Illuminant dependence arises because all tristimulus descriptions of a color are based on the appearance of the color to the human eye, therefore requiring not only an accurate model of human vision (provided by the Standard Observer in the CIE color spaces), but also the light used to illuminate the target object since this is the source of the light that reaches the eye. It should be noted that spectral data which is given as a percentage of the incoming light is not illuminant dependent since the percentage remains the same regardless of the incoming light.

Metamerism—Metamerism is a phenomenon whereby two colors can match under one set of viewing conditions, such as illuminant, but not under another. One form of metamerism is unique to colors input with a scanner or other RGB input device, such as a digital camera. Since the RGB primaries inherent in a desktop scanner are not necessarily traceable in any way to measurements of human vision (as are the CIE X, Y, and Z primaries), it is possible that two colors that appear quite different to a scanner may appear identical to a human eye. This difference can be exaggerated when these two RGB-defined colors are displayed on a monitor or converted to CMYK for print. The result is that strange color differences appear in colors reproduced from scanner data, that are not apparent in the original artwork. The opposite effect can also occur: the user may be able to perceive a difference between two colors in a piece of artwork which the scanner sees as the same color.

Chromatic Adaptation—In at least one embodiment of the invention, a calorimeter is used as color input device 16. A calorimeter is an instrument for measuring color in a way that models human vision. As such, a calorimeter measures the tristimulus values of a color with a response that is similar to the human eye. Most calorimeters report values in one of several CIE tristimulus color spaces such as CIE XYZ, xyY, Lab, or Luv. A method of converting the CIE tristimulus values measured under one light source to another light source in order to simulate the change in appearance is known as a Von Kries adaptation. (See *Color Science: Concepts and Methods, Quantitative Data and Formulae*, Gunter Wyszecki and W. S. Stiles (1982) 429–432).

Color Libraries

Color libraries are collections of colors. A color library may either be pre-defined (e.g., PANTONE®) or user created. In the latter form of color library, the user measures target colors with a suitable color input device (e.g., a spectrophotometer) and stores the newly created color library within the computing system.

Matching

Figure 4:
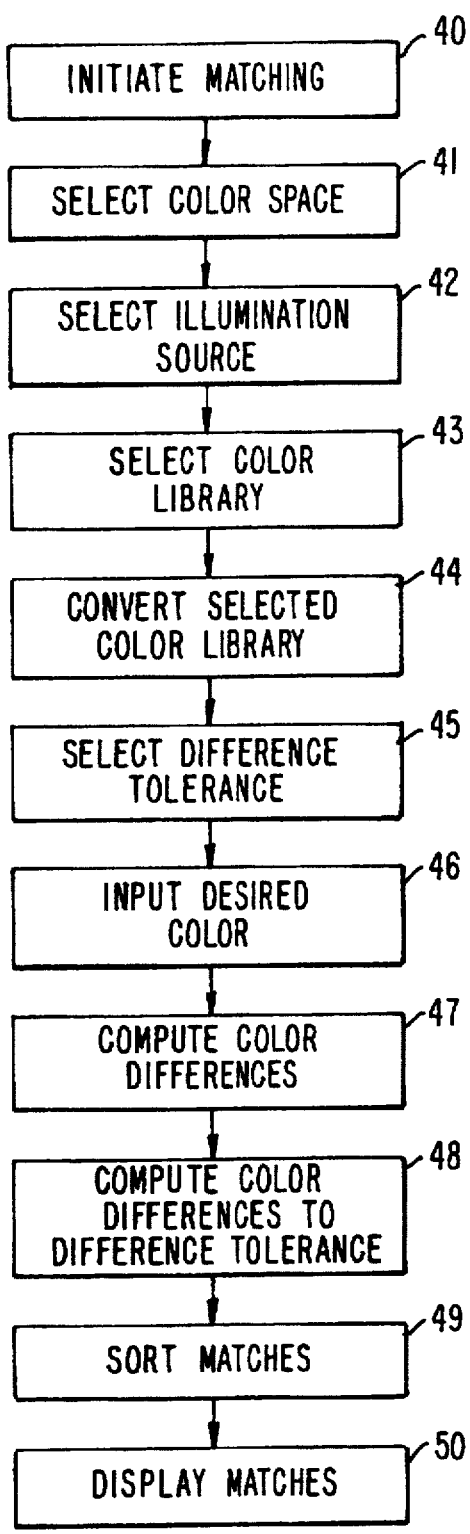
FIG. 4 is a flow chart showing a method performed by a computer for carrying out a color match according to the present invention.

FIG. 4 is a flow chart showing a method performed by a computer such as computer 12 for carrying out a color match according to one aspect of the present invention. The process begins when a user first initiates the matching routine (step 40). The user then selects the color space (step 41) and the desired illumination source (step 42). Next the user selects one or more color libraries 13 which are to be searched by computer 12 in an attempt to find a match to the desired color (step 43). After library 13 has been chosen, CMS 14 converts all of the colors within library 13 to the selected color space with the selected light source (step 44). For example, if the user had previously selected the CIE Lab color space and a light source spectra representative of daylight, CMS 14 would convert all of the individual colors within selected library 13 to their CIE Lab values under this illumination.

In the preferred embodiment the user must also select a difference tolerance (step 45). The difference tolerance indicates how close a color in library 13 must be to the desired color in order to be considered a "match." Higher numbers result in more matches. The difference tolerance value is specified in terms of ΔE. ΔE is the computed distance between two colors in the designated color space. For example, in the CIE Lab color space the difference between color 1 with a color value of $(L_1, a_1, b_1)$ and color 2 with a color value of $(L_2, a_2, b_2)$ is defined by:

$$\Delta E = [(L_1 - L_2)^2 + (a_1 - a_2)^2 + (b_1 - b_2)^2]^{1/2}.$$

Finally the user inputs the desired color (step 46). The user can input the desired color by measuring the color from a target using color input device 16. The user can also select a premeasured color as the desired color. The converted color library is then searched for matches by computing the color difference (ΔE) between each color within the library and the desired color (step 47), and comparing this difference to the previously specified difference tolerance (step 48). The list of matches is then sorted in order of increasing ΔE (step 49) and communicated, preferably via a display, to the user (step 50). In the preferred embodiment, computer 12 displays the total number of found matches (within the difference tolerance) and displays each of the found matches in descending order of closeness to the desired color. For the found matches, the computed color difference is shown as well as a color patch and the name of the color as specified in the color library. In an alternate embodiment, the user determines the desired number of colors to be displayed by computer 12, the colors selected by proximity to the target or desired color (i.e., minimizing color difference). As in the previous embodiment, besides the color patch representation of the selected colors, the computed color difference and the name of each of the colors may be displayed as well.

Appendix I attached hereto and forming an integral part of this application contains the source code for computer modules used to perform one embodiment of the matching function defined above.

Lighting

Figure 5:
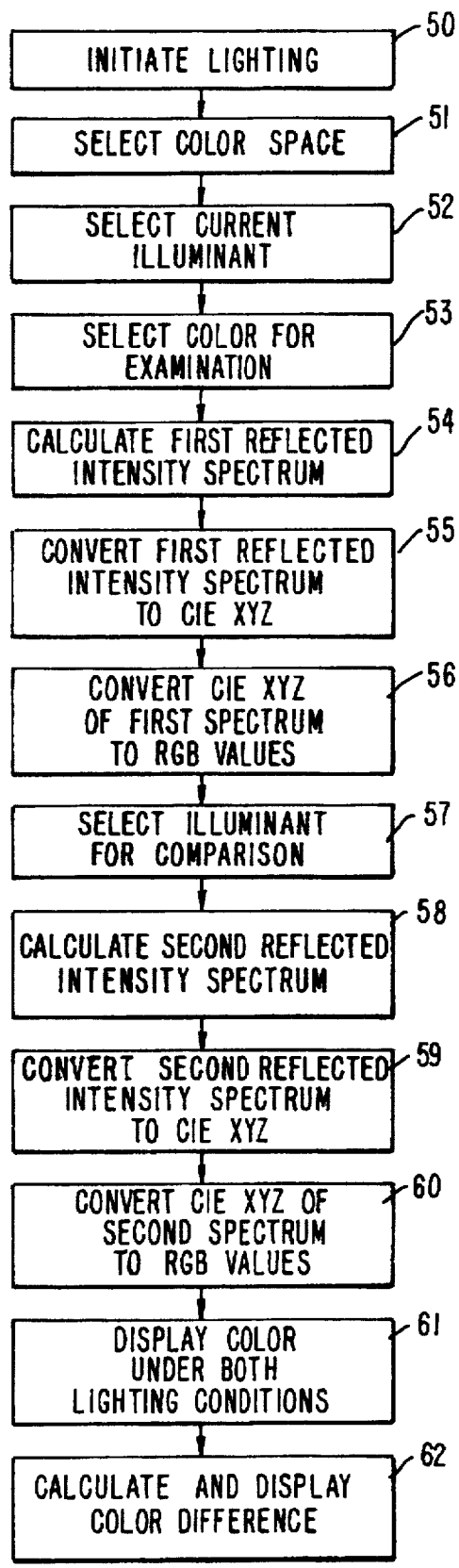
FIG. 5 is a flow chart showing a method performed by a computer allowing a user to preview a color under varying illumination sources according to the present invention.

FIG. 5 is a flow chart showing a method performed by computer 12 allowing a user to preview a color under varying illumination sources according to the present invention. A user first initiates the lighting routine (step 50). The user then sets the color space (step 51), the current illuminant (step 52), and selects the color to be examined (step 53). The color to be examined must be in the form of spectral data so that it is illumination independent. In the preferred embodiment the spectral data is in the form of a reflectance spectrum contained in a writable non-volatile memory coupled to or contained within computer 12. Computer 12 then multiplies the reflectance spectrum by the current illuminator spectrum to produce a first reflected intensity spectrum (step 54). CMS 14 converts the first reflected intensity spectrum to the CIE XYZ color space (step 55) and to RGB values (step 56).

Next, the user selects the comparison light source (step 57). Computer 12 multiplies the reflectance spectrum of the selected color by the spectrum of the comparison light source to produce a second reflected intensity spectrum (step 58). CMS 14 converts the second reflected intensity spectrum to the CIE XYZ color space (step 59) and to RGB values (step 60). In the preferred embodiment, the writable non-volatile memory coupled to or contained within computer 12 is also used for storing the spectral data associated with the illuminants.

Computer 12 displays the RGB values of the selected color under both the current illuminator and the comparison light source on monitor 18 (step 61). In the preferred embodiment computer 12 also calculates and displays the color difference (ΔE) due to the change in illuminant, the difference being given in the designated color space (step 62).

Appendix II attached hereto and forming an integral part of this application contains the source code for computer modules used to perform one embodiment of the light comparison function defined above.

The invention has now been explained with reference to specific embodiments. Other embodiments will be apparent to those of ordinary skill in the art. It is therefore not intended that this invention be limited, except as indicated by the appended claims.

APPENDIX I                                                    Page 1

```
/*+
 *
 *   File:       FtUiMtch.h
 *
 *   Contains:   FtUiMatch subclass (FtUiModel) which implements the user interface of
 *                   the Match Tool
 *
 *   Written by: Akin Dirik
 *
 *   Copyright:  COPYRIGHT (C) 1993-94 by LIGHTSOURCE, INC.
 *                   *WORLDWIDE RIGHTS RESERVED*
 *
 *   Change History:
 *
 *       09/13/94    AD      Renamed LcPalette.h to LcPal.h
 *       8/01/94     Eric    Declassify LcColor, causing renaming of
 *                               everything and much anguish in general.
 *       6/2/94      GR      Added async matching methods and object
 *                               variables
 *       4/8/94      Eric    Remove unneeded valid flag
 *       4/5/94      Eric    Prevent multiple setcolors
 *       04/04/94    AD      Added Receive() method
 *       3/28/94     Eric    Use const
 *       3/19/94     Eric    Sort matches by deltaE
 *       3/16/94     Eric    Check for initializing
 *       3/15/94     Eric    Add more stuff to do the real matching
 *       03/14/94    AD      Separated color library stuff into FuCLib; added deltaE
 *                               values display; store settings in preferences
 *       03/09/94    AD      Created
 *
 *   To Do:
-*/ ifndef _H_FtUiMtch
define _H_FtUiMtch
```

APPENDIX I                                                        Page 2

```
/* --------------------------- Includes --------------------------- */ ifndef _H_FtUiMdl
include "FtUiMdl.h"
endif ifndef _H_LcColor
include "LcColor.h"
endif ifndef _H_LcPal
include "LcPal.h"
#endif

/* --------------------------- Defines  --------------------------- */

/* --------------------------- Declares --------------------------- */ class FtUiMatch : public FtUiModel {
private:
        MenuHandle        itsMatchMenu;          // match color library popup-menu
        CxFieldPointer    itsToleranceField;     // ΔE tolerance field
        CxFieldPointer    itsColorSpaceField;    // ΔE color space field
        ControlHandle     itsScrollBar;          // palette list vertical scrollbar LsIndex           itsSelectedItem;       // selected match item
        LsUInt16          itsSelectedLibrary;    // selected library from popup
        LsUInt16          itsTolerance;          // tolerance value LsUInt16          itsVisItems;           // # of visible match items
        LsUInt16          itsTopItem;            //   top-most visible
```

APPENDIX I

Page 3 item #

| | | |
|---|---|---|
| LsUInt16 | itsItemWidth; | // match item width |
| LsUInt16 | itsItemHeight; | // match item height |
| CCrsrHandle | itsDragCursor; | // drag cursor |
| LsBoolean | itsUpdatedFlag; | // whether been updated |
| LcColor | itsColorToMatch; | // color to match |
| LcPaletteArrayPointer | itsMatchedColors; | // matched colors |
| LcPalettePointer | itsColorLibrary; | // color library palette |
| LcPaletteArrayPointer | itsPaletteLuvs; | // LUV/LAB values for palette |

APPENDIX I

Page 4

```
// Are we initializing (don't recalculate matches)?
        LsBoolean           initializing;

// Async matching state variables
        LsBoolean           itsIsMatching;          // in the process of matching
        LsBoolean           itsMatchesAreValid:     // the found match list is complete and
sorted
        LsIndex             itsMatchingMax;         // number of colors to be matched
against
        LsIndex             itsMatchingCurrent:     // index of next color to match
        LsFloat             itsMatchingTolerance;   // current tolerance for Lab or Lyv
        LsBoolean           itsIdleMarker;          // if true, display ... after 'Matching'

// load a color library
        void                loadColorLibrary( LsPString name );

// async matching routines; matchColors just calls startMatching
        void                matchColors( LsBoolean update );
        void                startMatching( void );
        void                idleMatching( void );
        void                displayMatches( LsBoolean update );

// rebuild palette LUV/LAB values for match
        void                getPaletteLuvs( void );

// Draw color space for calculating ΔEs
        void                drawColorSpace( void );

protected:
        // Constructor
        void                IFtUiMatch( void );
```

APPENDIX I                                                          Page 5 public:
        LsClassInternals( FtUiMatch )

// {OVERRIDE} load items from resource
        virtual void        LoadItems( void );

// {OVERRIDE} set control item
        virtual void        SetControlItem( LsInt16 item, ControlHandle control );

// {OVERRIDE} set popup menu item
        virtual void        SetPopupMenuItem( LsInt16 item, MenuHandle popupMenu );

// {OVERRIDE} set editable text field
        virtual void        SetEditTextItem( LsInt16 item, CxFieldPointer field );

// {OVERRIDE} post-process keyboard event in field
        virtual LsBoolean   PostKey( CxFieldPointer field );

// {OVERRIDE} process menu command
        virtual void        DoPopupMenuCommand( MenuHandle popupMenu, LsUInt16 item,
                                    LsUInt16 menuItem );

// {OVERRIDE} track scroll bar
        virtual void        TrackScrollBar( ControlHandle control, LsInt16 ctrlPart );

// {OVERRIDE} draw user-defined item
        virtual void        ItemDraw( LsInt16 item, Rect *itemRect, LsUInt16 depth );

// {OVERRIDE} process item hit
        virtual LsBoolean   ItemHit( LsInt16 item );

// {OVERRIDE} fix cursor
        virtual LsBoolean   FixCursor( Point localPt, LsBoolean inside );

// {OVERRIDE} set color
        virtual void        SetColor( LcColorConstPointer color );

// {OVERRIDE} get color
        virtual void        GetColor( LcColorPointer color );

// {OVERRIDE} broadcast color
        virtual void        BroadcastColor( LcColorConstPointer color );

// process palette item hit
        void                PaletteItemHit( Point localPt );

// draw palette list
        void                DrawPaletteList( Rect *itemRect, LsUInt16 depth );

// is a palette item visible?
        LsBoolean           IsPaletteItemVisible( LsIndex item );

// draw a palette item
        void                DrawPaletteItem( LsIndex item, Rect *itemRect,
                                    LsUInt16 depth );

APPENDIX I                                                                 Page 6

```
        // find list box cell from coordinate
        LsIndex             FindPaletteItem( Point localPt );

// get list box cell rectangle
        void                GetPaletteItemRect( LsIndex item, Rect *itemRect );

// draw selected/deselected palette item
        void                DrawSelectPaletteItem( LsBoolean selected, Rect *itemRect );

// select/deselect list box cell
        void                SelectPaletteItem( LsIndex item, LsBoolean select );

LsBoolean           DoIdle( void );

// process changes sent by a provider model
        virtual void        Receive( LfModelPointer provider,
                                                LfModelChangeToken aspectOfChange,
                                                LsPointer object );

// initialize
        static FtUiMatchPointerNew( void );
};

#endif // !_H_FtUiMtch
```

APPENDIX I                                                            Page 7

```
/*+
 * File:       FtUiMtch.c
 *
 * Contains:   FtUiMatch subclass (FtUiModel) which implements the user interface of
 *             the Match Tool
 *
 * Written by: Akin Dirik
 *
 * Copyright:  COPYRIGHT (C) 1993-94 by LIGHTSOURCE, INC.
 *             *WORLDWIDE RIGHTS RESERVED*
 *
 * Change History:
 *
 *     10/19/94    Eric     Remove duplicates >=2, not >2
 *     10/19/94    AD       Don't use LfReturnPrefOrDefault for retrieving
 *                          preferences
 *     10/06/94    AD       Add parameter to call to UIDrawTruncText() so that
 *                          matched color names aren't clipped
 *     09/29/94    Eric     Optimization. Minimize number of
 *                          function calls when building tables.
 *                          Remove duplicate matches.
 *                          Add cursors during load of library.
 *     09/26/94    AD       Removed FtPublic
 *     09/13/94    AD       Renamed LcPalette.h to LcPal.h
 *     08/16/94    Eric     Change UIDrawColorPatch
 *     08/02/94    AD       Updated for LcColor changes
 *     07/06/94    AD       Updated for parameter change to UIDrawColorPatch()
 *     06/28/94    Ken      Fixed idleMatching() in the case where it takes
 *                          longer than the time allowed for a single pass.
 *                          (The palette pointer wasn't properly initialized.)
 *     06/21/94    GR       FindPaletteItem was returning item beyond the
 *                          last one when the point was in the "gap" following
 *                          the last item.
 *     06/20/94    CM       Made default matching library load
 *                          prefOrDefault
 *     06/02/94    GR       Moved strings into resources; made match
 *                          process async by splitting matchColors into
 *                          startMatching/idleMatching/displayMatches
 *     06/01/94    GHerr    Added overdue support for CMC to various routines (not
 *                          that it works or anything.)  Also force redraw of
 *                          DeltaE in Receive handler for color space change.
 *     05/24/94    AD       Call SetDefaultInteger() to ensure that tolerance field
 *                          reverts to its default value when blank
 *     05/13/94    AD       Updated messages
 *     05/02/94    AD       Draw tool before processing color match
 *     04/22/94    AD       Updated for use with CxField
 *     04/20/94    Eric     Fix to work with empty colors
 *     04/11/94    Eric     Add an epsilon so that when matching within,
 *                          say, 7 delta E, you get matches of 7.00
 *                          (after rounding).
 *     04/08/94    Eric     Fixes to updating when color space changes.
 *     04/05/94    Eric     Prevent flashing
 *     04/04/94    AD       Added Receive() method
 *     03/28/94    Eric     Use const
 *     03/25/94    AD       Bug fixes for Seybold
 *     03/19/94    Eric     Sort matches by deltaE
 *     03/18/94    Eric     Bug fixes. Only recalculate matches if
 *                          not initializing. Check for empty
 *                          palettes more carefully. Init itsSelectedLibrary.
 *     03/15/94    Eric     Do real matching
```

APPENDIX I                                                      Page 8

```
 *    03/14/94    AD    Separated color library stuff into FuCLib; added deltaE
 *                      values display; store settings in preferences
 *    03/09/94    AD    Created
 *
 *  To Do:
 */

/* ------------------------- Includes ---------------------------------- */
// Fantasia
#ifndef _H_Fantasia
include "Fantasia.h"
endif
#ifndef _H_FtUiMtch
#include "FtUiMtch.h"
endif ifndef _H_DwPalettePane
include "DwPalettePane.h"
#endif
#ifndef _H_CtMsg
#include "CtMsg.h"
#endif
#ifndef _H_DvUiMdl
#include "DvUiMdl.h"
#endif
#ifndef _H_FtResComm
#include "FtResComm.h"
#endif
#ifndef _H_FuAnimCr
#include "FuAnimCr.h"
#endif
#ifndef _H_FuCLib
#include "FuCLib.h"
#endif
#ifndef _H_FuString
#include "FuString.h"
#endif
ifndef _H_LcPal
include "LcPal.h"
#endif
#ifndef _H_LcEPSF
#include "LcEPSF.h"
#endif
#ifndef _H_LfPref
#include "LfPref.h"
#endif
#ifndef _H_LsMath
#include "LsMath.h"
#endif
#ifndef _H_MacGlue
#include "MacGlue.h"
#endif
#ifndef _H_MdPref
#include "MdPref.h"
#endif
#ifndef _H_Ui
#include "Ui.h"
#endif
```

APPENDIX I                                                  Page 9

```c
// ANSI
#include <stdio.h>
#include <string.h>
include <stdlib.h>             // qsort // TCL
include <Global.h>
#include <Commands.h>
#include <Constants.h>

// Mac
#include <Aliases.h>
#include <Folders.h>
#include <Palettes.h>

/* ------------------------- Defines ------------------------------------ */ define LcCLIBFileType          LsTargetToken( 'C', 'L', 'I', 'B' )
define FtUiMatchType           LsTargetToken( 'M', 'T', 'C', 'H' )
#define FtUiStrType             LsTargetToken( 'S', 'T', 'R', 'T' )
#define FtUiToleranceType       LsTargetToken( 'T', 'O', 'L', 'R' )

define FtUiMatchDragCrsrID     200 define FtUiMatchDiffStrID      502
define FtUiMatchDiffLuv        1
#define FtUiMatchDiffLab        2
#define FtUiMatchDiffCMC        3

// As stated in the ERS, the default tolerance is 6 ΔE
define FtUiMatchDefaultTolerance   6 enum {
    FtUiMatchItemMatchMenu = 1,
    FtUiMatchItemToleranceLabel,
    FtUiMatchItemToleranceField,
    FtUiMatchItemToleranceStepper,
    FtUiMatchItemColorSpaceField,
    FtUiMatchItemHeader,
    FtUiMatchItemList,
    FtUiMatchItemScrollBar
};

#define FtUiMatchMiscStrID      503
enum {
    FuUiMatchNoneStringIndex = 1,
    FuUiMatchMatchedColorStringIndex,
    FuUiMatchMatchedColorsStringIndex,
    FuUiMatchDifferenceStringIndex,
    FuUiMatchMatchingStringIndex,
    FuUiMatchMarkerStringIndex,
    FuUiMatchFindStringIndex
};

#define ftMatchGrowElems        5

// Match when not quite exactly the right number
#define ftUiEpsilon             (.0099999)
```

APPENDIX I                                                    Page 10

```
// time slices for finding matches
#define FtUiMatchWorkTicks       20

/* ------------------------- Declares ---------------------------------- */ extern FtUiModelPointer      MakeTool( void );

static pascal void           drawPaletteListProc( short depth,
                                                  short deviceFlags,
                                                  GDHandle device,
                                                  long userData );

static void                  concatPStr( StringPtr source, const StringPtr suffix );

static LsInt16               populateColorLibraryMenu( MenuHandle menu,
                                                       LsInt16 vRefNum,
                                                       LsInt32 dirID );

EhDeclareFile

// A color we've matched, with delta E for sorting purposes.
typedef struct {
    LcColor       color;
    LsFloat       deltaE;
} FtMatchColor, *FtMatchColorPointer;

/* ------------------------- Routines ---------------------------------- */

LsClassImplementation( FtUiMatch )

/* ----------------------------------------------------------------------
 * MakeTool - Make this tool
 *
 * The function instantiates this tool. It is not a member function so that
 * the caller of this function doesn't need to know where it is.
 *
 * (-> input param, <- output param, <-> i/o param)
 *
 * returns       <- this tool object
 *
 * ----------------------------------------------------------------------
 */
FtUiModelPointer
MakeTool( void )
{
    return FtUiMatch::New();
}

/* ----------------------------------------------------------------------
 * New -    Allocate a FtUiMatch object
 *
 * The function does this, that and the other.  Then it does this again.
 *
 * (-> input param, <- output param, <-> i/o param)
 *
 * returns       <- A new object
 *
 * ----------------------------------------------------------------------
```

APPENDIX I                                                          Page 11

```
*/
static FtUiMatchPointer
FtUiMatch::New( void )
{
    FtUiMatchPointer    tool = LsNil;

if ( tool = new FtUiMatch )
        // Construction
        tool->IFtUiMatch();

return tool;
}

/* ----------------------------------------------------------------------
 * IFtUiMatch - Constructor
 *
 * (-> input param, <- output param, <-> i/o param)
 *
 * ----------------------------------------------------------------------
 */
void
FtUiMatch::IFtUiMatch( void )
{
    // Superclass construction
    IFtUiModel();

itsMatchedColors = LsNil;
    itsColorLibrary = LsNil;
    itsPaletteLuvs = LsNil;

EhTry (
        LcPalettePointer        pal;
        LcPaletteArrayPointer   mem;
        LsInt32                 elemSize;

mem = LcPaletteArray::New( sizeof( FtMatchColor ),
                                   0,
                                   ftMatchGrowElems,
                                   LmNoLimit );
        itsMatchedColors = mem;
        EhIncrement( mem );

pal = LcPalette::New();
        itsColorLibrary = pal;
        pal->Clear();
        EhIncrement( pal );

elemSize = LsMathMax( sizeof( LcLuvColor ), sizeof( LcLabColor ) );

mem = LcPaletteArray::New( elemSize, 0, 10, LmNoLimit );
        itsPaletteLuvs = mem;
        EhIncrement( mem );
    } EhCatch (
        EhThrowUp( MetaFtUiMatch );
    } EhEndTry;

LcClear( &itsColorToMatch );

// Set to a screwy value so that it'll match a color the first time
```

APPENDIX I                                                              Page 12

```
        itsColorToMatch.preferredSpace = LcColorSpaceEmpty;

itsMatchMenu = LsNil;
        itsToleranceField = LsNil;
        itsScrollBar = LsNil;
        itsDragCursor = LsNil;
        itsTolerance = FtUiMatchDefaultTolerance;
        itsSelectedLibrary = 0;

itsVisItems = 0;
        itsTopItem = 0;
        itsSelectedItem = LsBadIndex;

itsUpdatedFlag = LsFalse;

itsIsMatching = LsFalse;
        itsMatchesAreValid = LsTrue;
        itsMatchingMax = 0;
        itsMatchingCurrent = 0;
        itsMatchingTolerance = 0.0;
        itsIdleMarker = LsFalse;
}

/* ---------------------------------------------------------------------------
 * Dispose (OVERRIDE) - Get rid of this object
 *
 * This method destroys the object.
 *
 * (-> input param, <- output param, <-> i/o param)
 *
 * ---------------------------------------------------------------------------
 */
void
FtUiMatch::Dispose( void )
{
        // save currently chosen library name in preferences
        if ( itsMatchMenu && itsSelectedLibrary ) {
            LsPString    libraryName;

GetItem( itsMatchMenu, itsSelectedLibrary, (StringPtr) libraryName );
            LfPreferences::SavePreference(
                FtUiMatchType,
                FtUiStrType,
                0,
                (LsPointer) libraryName,
                (LsUInt32) libraryName[0] + 1 );
        }

// save current tolerance value in preferences
        {
            LsUInt16    tolerance = itsTolerance;

LfPreferences::SavePreference(
                FtUiMatchType,
                FtUiToleranceType,
                0,
                (LsPointer) &tolerance,
                sizeof(LsUInt16) );
        }
```

APPENDIX I                                                    Page 13

```
    if ( itsColorLibrary ) {
        itsColorLibrary->Decrement();
        itsColorLibrary = LsNil;
    }
    if ( itsMatchedColors ) {
        itsMatchedColors->Decrement();
        itsMatchedColors = LsNil;
    }
    if ( itsPaletteLuvs ) {
        itsPaletteLuvs->Decrement();
        itsPaletteLuvs = LsNil;
    }

// Superclass destruction
    FtUiModel::Dispose();
}

/* ---------------------------------------------------------------------
 * LoadItems (OVERRIDE) - Load dialog items from resource
 *
 * (-> input param, <- output param, <-> i/o param)
 *
 * ---------------------------------------------------------------------
 */
void
FtUiMatch::LoadItems( void )
{
    LsUInt16        defaultLibrary;
    LsPString       defaultLibraryName, libraryName;
    LsChar          toleranceString[256];
    LsUInt16        tolerance;
    LsUInt16        item;
    LfPrefErr       err;

CxDialog::LoadItems();

if ( itsMatchMenu ) {
        // get default color library from preferences
        err = LfPreferences::GetPreference(
            FtUiMatchType,
            FtUiStrType,
            0,
            LfReturnPrefOnly,
            (LsPointer) defaultLibraryName,
            255,
            LsNil );

// get menu index of default color library
        defaultLibrary = 1;
        if ( err == noErr ) {
            for ( item = 1; item <= CountMItems( itsMatchMenu ); item++ ) {
                GetItem( itsMatchMenu, item, libraryName );
                if ( EqualString( libraryName, defaultLibraryName, FALSE, TRUE ) ) {
                    defaultLibrary = item;
                    break;
                }
            }
        }
```

APPENDIX I                                             Page 14

```
        // set default color library
        itsSelectedLibrary = defaultLibrary;
        SetPopupMenuItemValue( FtUiMatchItemMatchMenu, defaultLibrary, LsFalse );
    } if ( itsToleranceField ) {
        err = LfPreferences::GetPreference(
            FtUiMatchType,
            FtUiToleranceType,
            0,
            LfReturnPrefOnly,
            (LsPointer) &tolerance,
            255,
            LsNil );

itsTolerance = (err == noErr ? tolerance : FtUiMatchDefaultTolerance);
        if ( FuLongToString( (LsInt32) itsTolerance, toleranceString ) )
            itsToleranceField->SetText( toleranceString, GetVisible() );
        itsToleranceField->SetDefaultInteger( FtUiMatchDefaultTolerance );
    }

// draw color space for calculating ΔE
    drawColorSpace();
}

/* -----------------------------------------------------------------------
 * SetPopupMenuItem (OVERRIDE) - Set popup menu item after it is loaded
 *
 * (-> input param, <- output param, <-> i/o param)
 *
 * item            -> item number
 * popupMenu       -> popup menu associated with this item
 * -----------------------------------------------------------------------
 */
void
FtUiMatch::SetPopupMenuItem( short item, MenuHandle popupMenu )
{
    short       vRefNum;    // volume reference of color library directory
    long        dirID;      // directory ID of color library directory
    short       count = 0;  // # of color libraries found
    LsBoolean   found;      // whether color library directory found switch ( item ) {
    case FtUiMatchItemMatchMenu:
        // try to automatically locate the color libraries directory
        found = FuCLibFindDirectory( &vRefNum, &dirID );

// populate the color library menu with color library files
        if ( found )
            count = populateColorLibraryMenu( popupMenu, vRefNum, dirID );

/* if no color library files were found, ask the user to manually
         * locate the color libraries directory
         */
        if ( !count ) {
            Str255 promptStr;

GetIndString( promptStr, FtUiMatchMiscStrID, PuUiMatchFindStringIndex );
            if ( FuCLibFindDirectoryManually( promptStr, &vRefNum, &dirID ) )
                count = populateColorLibraryMenu( popupMenu, vRefNum, dirID );
```

APPENDIX I
Page 15

```
        }

/* after all this, if no color library files were found, simply give
         * up and indicate "None" in the color library menu
         */
        if ( !count ) {
            Str63   noneStr;  // "\p(None"

GetIndString( noneStr, FtUiMatchMiscStrID, FuUiMatchNoneStringIndex );
            InsMenuItem( popupMenu, noneStr, 255 );
            DisableItem( popupMenu, 0 );
        } itsMatchMenu = popupMenu;
        break;
    }
}

/* ---------------------------------------------------------------------------
 * SetEditTextItem (OVERRIDE) - Set text edit item after it is loaded
 *
 * (-> input param, <- output param, <-> i/o param)
 *
 * item             -> item number
 * field            -> text edit associated with this item
 * ---------------------------------------------------------------------------
 */
void
FtUiMatch::SetEditTextItem( short item, CxFieldPointer field )
{
    switch( item ) {
    case FtUiMatchItemToleranceField:
        itsToleranceField = field;
        break;
    case FtUiMatchItemColorSpaceField:
        itsColorSpaceField = field;
        break;
    }
}

/* ---------------------------------------------------------------------------
 * SetControlItem (OVERRIDE) - Set control item after it is loaded
 *
 * (-> input param, <- output param, <-> i/o param)
 *
 * item             -> item number
 * control          -> control associated with this item
 * ---------------------------------------------------------------------------
 */
void
FtUiMatch::SetControlItem( short item, ControlHandle control )
{
    switch ( item ) {
    case FtUiMatchItemScrollBar:
        {
            Rect    paletteListRect;

itsScrollBar = control;
            GetItemRect( FtUiMatchItemList, &paletteListRect );
            itsItemWidth = paletteListRect.right - paletteListRect.left -
```

APPENDIX I    Page 16

```
DwPalettePaneMargin;
            itsItemHeight = DwPalettePaneVScale - DwPalettePaneMargin - 1;
            itsVisItems = (LsUInt16) (paletteListRect.bottom
                - paletteListRect.top)/itsItemHeight;
        }
        break;
    }
}

/* ---------------------------------------------------------------------------
 * DoPopupMenuCommand (OVERRIDE) - Process popup menu command
 *
 * (-> input param, <- output param, <-> i/o param)
 *
 * popupMenu         -> popup menu
 * item              -> item # of popup menu (baseitem already added)
 * menuItem          -> selected menu item
 * ---------------------------------------------------------------------------
 */
void
FtUiMatch::DoPopupMenuCommand( MenuHandle popupMenu, LsUInt16 item, LsUInt16 menuItem )
{
    LsPString     name;

if ( menuItem != itsSelectedLibrary ) {
        // get the selected menu item
        GetItem( popupMenu, menuItem, (StringPtr) name );

// load the selected color library
        loadColorLibrary( name );

itsSelectedLibrary = menuItem;
    }
}

/* ---------------------------------------------------------------------------
 * TrackScrollBar (OVERRIDE) - Track scroll bar
 *
 * The subclass should override this method.
 *
 * (-> input param, <- output param, <-> i/o param)
 *
 * event             -> event record
 * returns           <- whether the dialog consumed the event
 * ---------------------------------------------------------------------------
 */
void
FtUiMatch::TrackScrollBar( ControlHandle control, short ctrlPart )
{
    short      value = GetCtlValue( control );
    Rect       itemRect;
    LsBoolean  update = LsFalse;

switch( ctrlPart ) {
    case inDownButton:
        if ( value < GetCtlMax( control ) ) {
            SetCtlValue( control, value + 1 );
            update = LsTrue;
        }
```

APPENDIX I                                                              Page 17

```
        break;
    case inPageDown:
        if ( value < GetCtlMax( control ) ) {
            SetCtlValue( control, value + itsVisItems );
            update = LsTrue;
        }
        break;
    case inUpButton:
        if ( value > GetCtlMin( control ) ) {
            SetCtlValue( control, value - 1 );
            update = LsTrue;
        }
        break;
    case inPageUp:
        if ( value > GetCtlMin( control ) ) {
            SetCtlValue( control, value - itsVisItems );
            update = LsTrue;
        }
        break;
    } if ( update ) {
        LsUInt16          oldTopItem = itsTopItem;
        RgnHandle         updateRgn  = NewRgn();
        CxInstanceHandle  instance   = GetInstanceData();

itsTopItem = GetCtlValue( control );
        GetItemRect( FtUiMatchItemList, &itemRect );
        ScrollRect( &itemRect,
                    0,
                    (oldTopItem - itsTopItem)*itsItemHeight,
                    updateRgn );
        DeviceLoop( updateRgn,
                    drawPaletteListProc,
                    (long) instance,
                    singleDevices );
        DisposeRgn( updateRgn );

if ( itsSelectedItem != LsBadIndex
          && IsPaletteItemVisible( itsSelectedItem ) ) {
            GetPaletteItemRect( itsSelectedItem, &itemRect );
            DrawSelectPaletteItem( LsTrue, &itemRect );
        }
    }
}

/* ---------------------------------------------------------------------------
 * drawPaletteListProc - Callback for drawing palette list across multiple
 *                      monitors
 *
 * (-> input param, <- output param, <-> i/o param)
 *
 * depth          -> bit-depth of device
 * deviceFlags    -> device flags
 * targetDevice   -> device
 * userData       -> user-defined data
 * ---------------------------------------------------------------------------
 */
static pascal void
```

APPENDIX I                                                    Page 18

```
drawPaletteListProc( short depth, short deviceFlags, GDHandle device, long userData )
{
    CxInstanceHandle    instance = (CxInstanceHandle) userData;
    FtUiMatchPointer    this = (FtUiMatchPointer) (**instance).this;
    LsUInt32            a4Register = (**instance).a4Register;
    LsUInt32            saveRegister;
    Rect                itemRect;

GetA4( saveRegister );
    SetA4( a4Register );

this->GetItemRect( FtUiMatchItemList, &itemRect );
    this->DrawPaletteList( &itemRect, depth );

SetA4( saveRegister );
}

/* ---------------------------------------------------------------------------
 * PostKey (OVERRIDE) - Post-process keypress
 *
 * (-> input param, <- output param, <-> i/o param)
 *
 * textedit         -> text edit which is recipient of keypress
 * returns          <- whether to accept the value of the text edit (if FALSE is
 *                     returned, the text edit reverts to its previous value before
 *                     the last keypress)
 * ---------------------------------------------------------------------------
 */
LsBoolean
FtUiMatch::PostKey( CxFieldPointer field )
{
    LsInt32     toleranceNum;
    LsChar      toleranceString[256];

field->GetText( toleranceString );

if ( FuParseLong( toleranceString, &toleranceNum ) ) { if ( itsTolerance != (LsUInt16) toleranceNum ) {
            itsTolerance = (LsUInt16) toleranceNum;
            BeginDraw();
            matchColors( LsTrue );
            EndDraw();
        }
    } return LsTrue;
}

/* ---------------------------------------------------------------------------
 * FixCursor (OVERRIDE) - Fix the cursor as it enters/leaves the dialog
 *
 * (-> input param, <- output param, <-> i/o param)
 *
 * localPt          -> location of the cursor (local coordinates)
 * inside           -> whether the cursor is inside the dialog
 * returns          <- whether to restore the default cursor
 * ---------------------------------------------------------------------------
```

APPENDIX I

Page 19

```
*/
LsBoolean
FtUiMatch::FixCursor( Point localPt, LsBoolean inside )
{
    LsBoolean       defaultCursor = LsFalse;
    Rect            paletteListRect;
    LsIndex         item = LsBadIndex;

if ( inside ) {
        defaultCursor = LsTrue;
        GetItemRect( FtUiMatchItemList, &paletteListRect );
        if ( PtInRect( localPt, &paletteListRect )
          && (item = FindPaletteItem( localPt )) != LsBadIndex ) {
            if ( !itsDragCursor )
                itsDragCursor = GetCCursor( FtUiMatchDragCrsrID );
            SetCCursor( itsDragCursor );
            defaultCursor = LsFalse;
        }
    }

/* wait for tool to be drawn before matching initial color
     * (since it may take a while to process the match)
     */
    if ( !itsUpdatedFlag ) {
        LsUInt16        defaultLibrary = itsSelectedLibrary;

itsUpdatedFlag = LsTrue;

// force "itsSelectedLibrary" to be set
        itsSelectedLibrary = 0;

// load selected color library (this will set "itsSelectedLibrary")
        DoPopupMenuCommand( itsMatchMenu,
                            FtUiMatchItemMatchMenu,
                            defaultLibrary );

// match colors
        matchColors( LsTrue );
    } return defaultCursor;
}

/* ------------------------------------------------------------------------
 * BroadcastColor (OVERRIDE) - Tell anyone who's listening that our color
 *                            has changed
 *
 * (-> input param, <- output param, <-> i/o param)
 *
 * color            -> color to broadcast
 * ------------------------------------------------------------------------
 */
void
FtUiMatch::BroadcastColor( LcColorConstPointer color )
{
    FtUiModel::BroadcastColor( color );
}
```

APPENDIX I                                                    Page 20

```
/* ---------------------------------------------------------------
 * Receive (OVERRIDE) - process a message sent by a provider model
 *
 * (-> input param, <- output param, <-> i/o param)
 *
 * provider         -> source of the change message
 * aspectOfChange   -> change message
 * object           -> object to receive
 * ---------------------------------------------------------------
 */
void
FtUiMatch::Receive( LfModelPointer provider,
                    LfModelChangeToken aspectOfChange,
                    LsPointer object )
{
    LcColor        newColor;

switch ( aspectOfChange ) {
    case DvUiModelMsgColorSpaceChanged:
        // Recalculate the XYZs in the color library
        itsColorLibrary->RecalcColors();

// Recalculate delta E's for the color library
        getPaletteLuvs();

// Draw new color space
        drawColorSpace();

// Color tables actually changed. Recompute color
        LcCopy( &itsColorToMatch, &newColor );
        LcRecalculate( &newColor );

// Set the color, which matches colors...
        SetColor( &newColor );
        break;

case MdPrefMsgDeltaESpaceChanged:
        // Draw new color space
        drawColorSpace();

// Recalculate delta E's for the color library
        getPaletteLuvs();

// Now recalculate closest matches
        BeginDraw();
        matchColors( LsTrue );
        EndDraw();
        break;
    }
}

/* ---------------------------------------------------------------
 * SetColor (OVERRIDE) - Set color
 *
 * (-> input param, <- output param, <-> i/o param)
 *
 * color            -> color element pointer
 * ---------------------------------------------------------------
 */
void
```

APPENDIX I                                              Page 21

```
FtUiMatch::SetColor( LcColorConstPointer color )
{
    if ( !LcEqual( color, &itsColorToMatch ) ) {
        LcCopy( color, &itsColorToMatch );
        if ( itsUpdatedFlag ) {
            BeginDraw();
            matchColors( GetVisible() );
            EndDraw();
        }
    }
}

/* -----------------------------------------------------------------------
 * GetColor (OVERRIDE) - Get tool's current color
 *
 * (-> input param, <- output param, <-> i/o param)
 *
 * color              <- current color
 * -----------------------------------------------------------------------
 */
void
FtUiMatch::GetColor( LcColorPointer color )
{
    if ( itsSelectedItem != LsBadIndex && itsMatchedColors
        && itsSelectedItem < itsMatchedColors->GetLength() ) {
        FtMatchColor    matchedColor;

itsMatchedColors->Retrieve( itsSelectedItem, &matchedColor );
        LcCopy( &matchedColor.color, color );
    }
}

/* -----------------------------------------------------------------------
 * ItemHit (OVERRIDE) - Process an item hit
 *
 * (-> input param, <- output param, <-> i/o param)
 *
 * item              -> item in dialog which was hit (baseItem already added)
 * -----------------------------------------------------------------------
 */
LsBoolean
FtUiMatch::ItemHit( short item )
{
    Boolean         hit = LsFalse;
    Rect            paletteListRect;

switch ( item ) {
    case FtUiMatchItemList:
        PaletteItemHit( GetItemHit() );
        hit = LsTrue;
        break;
    case FtUiMatchItemScrollBar:
        if ( GetCtlValue( itsScrollBar ) != itsTopItem ) { itsTopItem = GetCtlValue( itsScrollBar );
            GetItemRect( FtUiMatchItemList, &paletteListRect );
            EraseRect( &paletteListRect );
            DrawItem( FtUiMatchItemList );
        }
        break;
```

APPENDIX I                                                              Page 22

```
    )
    return hit;
}

/* ---------------------------------------------------------------------------
 * ItemDraw (OVERRIDE) - Draw a user-defined item (during an update event)
 *
 * The subclass should override this method.
 *
 * (-> input param, <- output param, <-> i/o param)
 *
 * item            -> item in dialog which needs to be drawn (baseItem already added)
 * itemRect        -> item's rectangle
 * depth           -> screen depth
 * ---------------------------------------------------------------------------
 */
void
FtUiMatch::ItemDraw( short item, Rect *itemRect, LsUInt16 depth )
{
    ColorSpec      saveForeColor, saveBackColor;

SaveFore( &saveForeColor );
    SaveBack( &saveBackColor );

switch ( item ) {
    case FtUiMatchItemList:
        DrawPaletteList( itemRect, depth );
        break;
    case FtUiMatchItemHeader:
        FrameRect( itemRect );
        if ( itsMatchedColors ) {
            RGBColor    backRGBColor, titleBarColor, titleColor;
            LsChar      matchedItemsString[32];
            LsChar      closenessString[32];
            LsUInt16    numColors = (LsUInt16) itsMatchedColors->GetLength();
            Rect        headerRect = *itemRect;
            Str63       tempStr;

InsetRect( &headerRect, 1, 1 );

GetForeColor( &titleBarColor );
            GetBackColor( &backRGBColor );
            GetGray( GetMainDevice(), &backRGBColor, &titleBarColor );
            RGBBackColor( &titleBarColor );
            EraseRect( &headerRect );

UIGetTextColor( &titleBarColor, &titleColor );
            RGBForeColor( &titleColor );
            InsetRect( &headerRect, 4, 1 );

// if we're in the process of matching, display the word
            // "Matching" sometimes followed by an ellipse (the marker)

if ( itsIsMatching ) {
                GetIndString( tempStr,
                    FtUiMatchMiscStrID, FuUiMatchMatchingStringIndex );  // "\pMatching"

if ( itsIdleMarker ) {
```

APPENDIX I                                                          Page 23

```
                    Str15   markStr;

GetIndString( markStr,
                        FtUiMatchMiscStrID, FuUiMatchMarkerStringIndex ); // "\p..."
                    concatPStr( tempStr, markStr );
                }
            }
            else if ( numColors == 1 )
                GetIndString( tempStr,
                    FtUiMatchMiscStrID, FuUiMatchMatchedColorStringIndex ); //"\p%d
Matched Color"
            else
                GetIndString( tempStr,
                    FtUiMatchMiscStrID, FuUiMatchMatchedColorsStringIndex ); //"\p%d
Matched Colors"
            p2cstr(tempStr);

sprintf( (char *) matchedItemsString, (char *) tempStr,
                numColors );
            TextBox( (Ptr) matchedItemsString, strlen(matchedItemsString),
                &headerRect, teFlushDefault );

if ( !itsIsMatching ) {
                GetIndString( tempStr,
                    FtUiMatchMiscStrID, FuUiMatchDifferenceStringIndex );
//"\pDifference"
                p2cstr( tempStr );
                headerRect.left = (headerRect.left + headerRect.right) / 2 + 8;
                strcpy( (char *) closenessString, (char *) tempStr );
                TextBox( (Ptr) closenessString, strlen(closenessString),
                    &headerRect, teFlushRight );
            }
        }
        break;
    }

RestoreBack( &saveBackColor );
    RestoreFore( &saveForeColor );
}

/* ---------------------------------------------------------------------
 * PaletteItemHit - Process palette item hit
 *
 * (-> input param, <- output param, <-> i/o param)
 *
 * localPt          -> hit point in local coordinates
 * ---------------------------------------------------------------------
 */
void
FtUiMatch::PaletteItemHit( Point localPt )
{
    LsIndex             item = LsBadIndex;
    Rect                itemRect;

// determine which item in the palette was hit
    item = FindPaletteItem( localPt );

// item hit in a color patch or color name
    if ( item != LsBadIndex ) {
```

APPENDIX I                                                          Page 24

```
        // select the palette item
        SelectPaletteItem( item, LsTrue );

// double-click: broadcast the selected color
        if ( GetItemClicks() == 2 ) {
            LcColor             patchColor;

GetColor( &patchColor );
            BroadcastColor( &patchColor );
        // single-click: drag-n-drop
        } else {
            FtMatchColor        dragColor;

GetPaletteItemRect( item, &itemRect );
            itsMatchedColors->Retrieve( item, &dragColor );
            if ( UiMouseDownIsDrag( &localPt ) )
                DragNDropColor( &itemRect, &dragColor.color );
        }
    }
}

/* ---------------------------------------------------------------------------
 * DrawPaletteList - Draw palette list
 *
 * (-> input param, <- output param, <-> i/o param)
 *
 * paletteListRect  -> palette list's rectangle
 * depth            -> screen depth
 * ---------------------------------------------------------------------------
 */
void
FtUiMatch::DrawPaletteList( Rect *paletteListRect, LsUInt16 depth )
{
    Rect        itemRect;
    LsIndex     item;
    LsIndex     lastItem;

InsetRect( paletteListRect, -1, -1 );
    UIDrawLabelFrame( paletteListRect, LsNil, 0, depth );
    InsetRect( paletteListRect, 1, 1 );

GetPaletteItemRect( itsTopItem, &itemRect );

if ( itsMatchesAreValid ) {
        if ( itsMatchedColors ) {
            lastItem = Min( itsMatchedColors->GetLength(), itsTopItem + itsVisItems );
            for ( item = itsTopItem; item < lastItem; item++ ) {
                DrawPaletteItem( item, &itemRect, depth );
                itemRect.top    += itsItemHeight;
                itemRect.bottom += itsItemHeight;
            }
        } if ( itsSelectedItem != LsBadIndex && IsPaletteItemVisible( itsSelectedItem ) )
        {
            GetPaletteItemRect( itsSelectedItem, &itemRect );
            DrawSelectPaletteItem( LsTrue, &itemRect );
        }
    }
```

APPENDIX I                                                           Page 25

```
}

/* ---------------------------------------------------------------------
 * IsPaletteItemVisible - Returns whether given palette item is currently visible
 *
 * (-> input param, <- output param, <-> i/o param)
 *
 * item              -> palette item
 * returns           <- whether item is visible
 * ---------------------------------------------------------------------
 */
LsBoolean
FtUiMatch::IsPaletteItemVisible( LsIndex item )
{
    return ( item >= itsTopItem && item <= itsTopItem + itsVisItems - 1 );
}

/* ---------------------------------------------------------------------
 * DrawPaletteItem - Draws a palette item
 *
 * (-> input param, <- output param, <-> i/o param)
 *
 * item              -> palette item
 * itemRect          -> palette item's rectangle
 * depth             -> screen bit-depth
 * ---------------------------------------------------------------------
 */
void
FtUiMatch::DrawPaletteItem( LsIndex item, Rect *itemRect, LsUInt16 depth )
{
    FontInfo           fInfo;
    ColorSpec          saveForeColor, saveBackColor;
    FtMatchColor       matchColor;
    Rect               colorRect;
    LsUInt16           saveColorRectRight;
    LsDouble           deltaE;
    LsChar             deltaEString[32];
    LsUInt32           deltaELength = 0;
    LsInt16            deltaEWidth;

SaveFore( &saveForeColor );
    SaveBack( &saveBackColor );

GetFontInfo( &fInfo );
    MoveTo( itemRect->left + 20, itemRect->top + fInfo.ascent );

EraseRect( itemRect );
    if ( itsMatchedColors )
        itsMatchedColors->Retrieve( item, &matchColor );

colorRect = *itemRect;
    colorRect.left += DwPalettePaneMargin;
    colorRect.top  += DwPalettePaneMargin;

UIDrawLabelFrame( &colorRect, LsNil, 0, depth );

InsetRect( &colorRect, 2, 2 );
    saveColorRectRight = colorRect.right;
```

APPENDIX I                                                              Page 26

```
    colorRect.right = colorRect.left + DwPalettePaneVScale
        + DwPalettePaneMargin;

UIDrawColorPatch(
        &colorRect,
        &matchColor.color,
        LsNil,
        0,
        LsTrue,
        depth,
        LsNil );

RestoreFore( &saveForeColor );
    RestoreBack( &saveBackColor );

// calculate the delta-E string and determine its length & width
    deltaE = LcDeltaE( &itsColorToMatch.XYZ, &matchColor.color.XYZ );
    if ( FuDoubleToString( deltaE, 3, deltaEString ) ) {
        deltaELength = strlen(deltaEString);
        deltaEWidth = TextWidth( (Ptr) deltaEString, 0, deltaELength );
    }

// draw the match color name
    if ( matchColor.color.name[0] ) {
        colorRect.left  = colorRect.right + DwPalettePaneMargin;
        colorRect.right = saveColorRectRight - deltaEWidth - 2;

UIDrawTruncText( &colorRect, matchColor.color.name,
            strlen( matchColor.color.name ), teFlushLeft, LsFalse );
    }

// draw the delta-E string
    if ( deltaELength ) {
        colorRect.right = saveColorRectRight;
        colorRect.left = colorRect.right - TextWidth( (Ptr) deltaEString,
            0, deltaELength );
        TextBox( (Ptr) deltaEString, deltaELength, &colorRect, teFlushDefault );
    }

RestoreFore( &saveForeColor );
    RestoreBack( &saveBackColor );
}

/* ---------------------------------------------------------------------------
 * FindPaletteItem - Find palette item at specified coordinates
 *
 * (-> input param, <- output param, <-> i/o param)
 *
 * localPt           -> hit point in local coordinates
 * returns           <- found palette item
 * ---------------------------------------------------------------------------
 */
LsIndex
FtUiMatch::FindPaletteItem( Point localPt )
{
    LsIndex              topItem;
    Rect                 topItemRect, paletteListRect;
    DwPalettePaneWhere   result = DwPalettePaneNoWhere;
```

APPENDIX I                                          Page 27

```
    GetItemRect( FtUiMatchItemList, &paletteListRect );

topItemRect = paletteListRect;
    topItemRect.right  = topItemRect.left + itsItemWidth;
    topItemRect.bottom = topItemRect.top + itsItemHeight;

topItem = itsTopItem;
    topItem--;

if ( itsMatchedColors ) {
        while ( ++topItem < itsMatchedColors->GetLength() ) {
            if ( PtInRect( localPt, &topItemRect ) ) {
                if ( localPt.v <= topItemRect.top + (DwPalettePaneMargin / 2) ) {
                    result = DwPalettePaneInGap;
                } else if ( localPt.v >= topItemRect.bottom
                    - (DwPalettePaneMargin / 2) ) {
                    result = DwPalettePaneInGap;
                    if ( ( topItem + 1 ) < itsMatchedColors->GetLength() )   /* GR 6/21
*/
                        topItem++;
                } else if ( localPt.h >= topItemRect.left + DwPalettePaneVScale +
DwPalettePaneMargin )
                    result = DwPalettePaneInColorName;
                else
                    result = DwPalettePaneInColor;
                break;
            } topItemRect.top    += itsItemHeight;
            topItemRect.bottom += itsItemHeight;
        }
    } return ( result == DwPalettePaneNoWhere ? LsBadIndex : topItem );
}

/* -----------------------------------------------------------------------------
 * GetPaletteItemRect - Gets palette item rectangle
 *
 * (-> input param, <- output param, <-> i/o param)
 *
 * item             -> palette item
 * itemRect         <- palette item rectangle
 * -----------------------------------------------------------------------------
 */
void
FtUiMatch::GetPaletteItemRect( LsIndex item, Rect *itemRect )
{
    LsInt16     topItem;
    Rect        paletteListRect, topItemRect;
    LsBoolean   found = LsFalse;

GetItemRect( FtUiMatchItemList, &paletteListRect );

topItemRect = paletteListRect;
    topItemRect.right  = topItemRect.left + itsItemWidth;
    topItemRect.bottom = topItemRect.top + itsItemHeight;

topItem = itsTopItem;
```

APPENDIX I                                         Page 28

```
    topItem--;

if ( itsMatchedColors ) {
        while ( ++topItem < itsMatchedColors->GetLength() ) {
            if ( item == topItem ) {
                found = LsTrue;
                break;
            } topItemRect.top    += itsItemHeight;
            topItemRect.bottom += itsItemHeight;
        }
    }

*itemRect = topItemRect;
}

/* ---------------------------------------------------------------------------
 * DrawSelectPaletteItem - Draw selected/deselected palette item
 *
 * (-> input param, <- output param, <-> i/o param)
 *
 * selected       -> whether selected
 * itemRect       -> palette item rectangle
 * ---------------------------------------------------------------------------
 */
void
FtUiMatch::DrawSelectPaletteItem( LsBoolean selected, Rect *itemRect )
{
    ColorSpec     saveForeColor, saveBackColor;
    Rect          paletteListRect;
    Rect          itemFrameRect = *itemRect;
    RgnHandle     saveClip = NewRgn();

GetClip( saveClip );
    GetItemRect( FtUiMatchItemList, &paletteListRect );
    ClipRect( &paletteListRect );

SaveFore( &saveForeColor );
    SaveBack( &saveBackColor );
    if ( !selected )
        RestoreFore( &saveBackColor );

PenSize( 2, 2 );
    itemFrameRect.left++;
    itemFrameRect.top++;
    itemFrameRect.right  += 3;
    itemFrameRect.bottom += 3;
    FrameRect( &itemFrameRect );
    PenSize( 1, 1 );
    RestoreFore( &saveForeColor );

SetClip( saveClip );
    DisposeRgn( saveClip );
}

/* ---------------------------------------------------------------------------
 * SelectPaletteItem - Select/deselect palette item
```

APPENDIX I                                                          Page 29

```
 *
 * (-> input param, <- output param, <-> i/o param)
 *
 * item             -> palette item
 * select           -> whether to select/deselect
 * ---------------------------------------------------------------------------
 */
void
FtUiMatch::SelectPaletteItem( LsIndex item, LsBoolean select )
{
    Rect    itemRect;

if ( select ) {
        if ( itsSelectedItem != LsBadIndex && itsSelectedItem != item
          && IsPaletteItemVisible( itsSelectedItem ) ) {
            GetPaletteItemRect( itsSelectedItem, &itemRect );
            DrawSelectPaletteItem( LsFalse, &itemRect );
        } itsSelectedItem = item;
    }

GetPaletteItemRect( item, &itemRect );
    DrawSelectPaletteItem( select, &itemRect );
}

/* ---------------------------------------------------------------------------
 * loadColorLibrary - load a color library with the specified descriptive name
 *
 * (-> input param, <- output param, <-> i/o param)
 *
 * name             -> color library name (Pascal-string)
 * ---------------------------------------------------------------------------
 */
void
FtUiMatch::loadColorLibrary( LsPString name )
{
    OSErr       err;
    short       vRefNum;
    long        dirID;
    FuAnimatedCursorPointer animatedCursor = LsNil;

if ( FuCLibFindDirectory( &vRefNum, &dirID ) ) {
        itsColorLibrary->Clear();

animatedCursor = FuAnimatedCursor::New();

err = FuCLibLoad( itsColorLibrary, vRefNum, dirID, name );

if ( animatedCursor )
            animatedCursor->Dispose();

if ( err == noErr ) {
            // Recompute internal palette values
            getPaletteLuvs();
            matchColors( LsTrue );
        }
    }
}
```

APPENDIX I                                                              Page 30

```
/* ---------------------------------------------------------------------------
 * getPaletteLuvs - After a palette of colors has been loaded, precompute
 *                  some internal values to make matching faster.
 *
 * ---------------------------------------------------------------------------
 */
void
FtUiMatch::getPaletteLuvs( void )
{
    LsBoolean             found;
    LsIndex               numColors;
    LsInt16               i, elemSize;
    LcColorSpace          deltaESpace = LcGetDeltaESpace();
    FuAnimatedCursorPointer animatedCursor = LsNil;
    LcColorPointer        currentColor;

animatedCursor = FuAnimatedCursor::New();

if ( itsColorLibrary ) {
        numColors = itsColorLibrary->GetNumColors();

if ( deltaESpace == LcColorSpaceLuv )
            elemSize = sizeof( LcLuvColor );
        else
            elemSize = sizeof( LcLabColor );

// Make sure we're the right size
        itsPaletteLuvs->SetLength( numColors );
        numColors = itsColorLibrary->GetNumColors();          // Just in case if ( deltaESpace == LcColorSpaceLuv ) {
            LcLuvColorPointer    paletteLuvs;
            LcLuvColor           emptyLuv;

emptyLuv.L = 0;
            emptyLuv.u = 0;
            emptyLuv.v = 0;

paletteLuvs = itsPaletteLuvs->LockTemporary();
            currentColor = itsColorLibrary->LockTemporary();

if ( paletteLuvs && currentColor ) {
                for ( i = 0; i < numColors; i++ ) {
                    if ( currentColor->preferredSpace != LcColorSpaceEmpty )
                        LcGetLuv( currentColor, paletteLuvs );
                    else
                        *paletteLuvs = emptyLuv;
                    paletteLuvs++;
                    currentColor++;
                }
                itsPaletteLuvs->Unlock();
                itsColorLibrary->Unlock();
            }
        } else if ( deltaESpace == LcColorSpaceLab ) {
            LcLabColorPointer    paletteLabs;
            LcLabColor           emptyLab;

emptyLab.L = 0;
            emptyLab.a = 0;
```

APPENDIX I                                                          Page 31

```
            emptyLab.b = 0;

paletteLabs = itsPaletteLuvs->LockTemporary();
            currentColor = itsColorLibrary->LockTemporary();

if ( paletteLabs && currentColor ) {
                for ( i = 0; i < numColors; i++ ) {
                    if ( currentColor->preferredSpace != LcColorSpaceEmpty )
                        LcGetLab( currentColor, paletteLabs );
                    else
                        *paletteLabs = emptyLab;
                    paletteLabs++;
                    currentColor++;
                }
                itsPaletteLuvs->Unlock();
                itsColorLibrary->Unlock();
            }
        } else {     // CMC
            // No point in precomputing anything since this is going to be
            // incredibly slow....
        }
    } if ( animatedCursor )
        animatedCursor->Dispose();
}

/* ---------------------------------------------------------------------------
 * compareColors - Comparison function for qsort with FtMatchColors
 *
 *
 * (-> input param, <- output param, <-> i/o param)
 *
 * ---------------------------------------------------------------------------
 */
static int
compareColors(const void *m1, const void *m2)
{
    LsDouble          diff;

diff = ((FtMatchColorPointer) m1)->deltaE
         - ((FtMatchColorPointer) m2)->deltaE;
    if ( diff < 0.0 )
        return -1;
    else if ( diff > 0.0 )
        return 1;
    else
        return 0;
}
/* ---------------------------------------------------------------------------
 * drawColorSpace - draws current color space
 *
 * (-> input param, <- output param, <-> i/o param)
 *
 * ---------------------------------------------------------------------------
 */
void
FtUiMatch::drawColorSpace( void )
```

APPENDIX I                                                    Page 32

```
{
    LsInt16         index = 0;
    LsChar          deltaESpace[256];

switch( LcGetDeltaESpace() ) {
    case LcColorSpaceLuv:
        index = FtUiMatchDiffLuv;
        break;
    case LcColorSpaceLab:
        index = FtUiMatchDiffLab;
        break;
    case LcColorSpaceCMC:
        index = FtUiMatchDiffCMC;
        break;
    } if ( index ) {
        GetIndString( (StringPtr) deltaESpace, FtUiMatchDiffStrID, index );
        PtoCstr( (StringPtr) deltaESpace );
        itsColorSpaceField->SetText( deltaESpace, GetVisible() );
    }
}

/* ------------------------------------------------------------------------
 * DoIdle - Process idling (OVERRIDE)
 *
 * Do the matching at idle time.
 *
 * (-> input param, <- output param, <-> i/o param)
 *
 * returns          <- whether to restore the default cursor
 * ------------------------------------------------------------------------
 */
LsBoolean
FtUiMatch::DoIdle( void )
{
    idleMatching();

return inherited::DoIdle();
}

/* ------------------------------------------------------------------------
 * matchColors - vestigial routine which resets and starts the matching
 *               process
 *
 * update            -> whether to update user-interface (ignored)
 * ------------------------------------------------------------------------
 */
void
FtUiMatch::matchColors( LsBoolean update )
{
    startMatching();
}

/* ------------------------------------------------------------------------
 * startMatching/idleMatching - match a color according to the current context
 *
 * startMatching should be called when one or more of the following variables
 * changes:
 *      1) the tolerance value (in ΔE) as specified in the tolerance field
```

APPENDIX I                                                      Page 33

```
*       2) the color library as specified in the match popup menu
*       3) the current color of the tool
*
* idleMatching actually does the matching, according to the current
* values of itsMatchingCurrent and itsMatchingMax
*
* (-> input param, <- output param, <-> i/o param)
* ---------------------------------------------------------------------
*/
void
FtUiMatch::startMatching( void )
{
    // start the process of matching at idle time itsIsMatching = LsFalse;
    itsMatchesAreValid = LsFalse;

// clear the matched list, reset the counters and max value,
    // determine the desired tolerance, and redraw the match item list itsMatchedColors->Clear();

if ( itsColorLibrary ) {
        itsMatchingMax = itsColorLibrary->GetNumColors();
        itsIsMatching = LsTrue;
    }
    else
        itsMatchingMax = 0;

itsMatchingCurrent = 0;

itsMatchingTolerance = (itsTolerance + ftUiEpsilon)
                            * (itsTolerance + ftUiEpsilon);

UpdateItem( FtUiMatchItemList );
} void
FtUiMatch::idleMatching( void )
{
    LcColorSpace      deltaESpace = LcGetDeltaESpace();
    long              startTicks;

if ( !itsIsMatching )
        return;

startTicks = TickCount();

/* While there are more colors to check for matches
     * and we haven't been checking for too long...
     *
     * get all colors whose DeltaE is less than itsTolerance,
     * and place these into itsMatchPalette.
     */ if ( itsColorLibrary && itsMatchingMax ) {

FtMatchColor    matchColor;

if ( deltaESpace == LcColorSpaceLuv ) {
```

APPENDIX I                                              Page 34

```
            LcLuvColor          luvToMatch;
            LcLuvColorPointer   paletteLuvs;
            LsFloat             dL, du, dv, deltaE;

LcGetLuv( &itsColorToMatch, &luvToMatch );

paletteLuvs = itsPaletteLuvs->LockPermanent();
            if ( paletteLuvs ) {

// Set the pointer in case we didn't finish last time
                paletteLuvs += itsMatchingCurrent;

while (itsMatchingCurrent < itsMatchingMax
                        && (startTicks + FtUiMatchWorkTicks) > TickCount() ) { dL = luvToMatch.L - paletteLuvs->L;
                    du = luvToMatch.u - paletteLuvs->u;
                    dv = luvToMatch.v - paletteLuvs->v;
                    paletteLuvs++;

deltaE = dL * dL + du * du + dv * dv;

if ( deltaE <= itsMatchingTolerance ) {
                        itsColorLibrary->GetColor( itsMatchingCurrent,
&matchColor.color );
                        if ( matchColor.color.preferredSpace != LcColorSpaceEmpty ) {
                            matchColor.deltaE = deltaE;

itsMatchedColors->Append( &matchColor );
                        }
                    }

// go on to next color
                    itsMatchingCurrent++;
                }
                itsPaletteLuvs->Unlock();
            }
        } else if ( deltaESpace == LcColorSpaceLab ) {
            LcLabColor          labToMatch;
            LcLabColorPointer   paletteLabs;
            LsFloat             dL, da, db, deltaE;

LcGetLab( &itsColorToMatch, &labToMatch );

paletteLabs = itsPaletteLuvs->LockPermanent();
            if ( paletteLabs ) {

// Set the pointer in case we didn't finish last time
                paletteLabs += itsMatchingCurrent;

while (itsMatchingCurrent < itsMatchingMax
                        && (startTicks + FtUiMatchWorkTicks) > TickCount() ) { dL = labToMatch.L - paletteLabs->L;
                    da = labToMatch.a - paletteLabs->a;
                    db = labToMatch.b - paletteLabs->b;
                    paletteLabs++;

deltaE = dL * dL + da * da + db * db;
```

APPENDIX I                                              Page 35

```
                if ( deltaE <= itsMatchingTolerance ) {
                    itsColorLibrary->GetColor( itsMatchingCurrent,
&matchColor.color );
                    if ( matchColor.color.preferredSpace != LcColorSpaceEmpty ) {
                        matchColor.deltaE = deltaE;
                        itsMatchedColors->Append( &matchColor );
                    }
                }
                itsMatchingCurrent++;
            }
            itsPaletteLuvs->Unlock();
        }
    } else {      // CMC LsFloat          deltaE;
        LsFloat          cmcTolerance;

// Tolerance is exact
        cmcTolerance = itsTolerance + ftUiEpsilon;

while (itsMatchingCurrent < itsMatchingMax
               && (startTicks + FtUiMatchWorkTicks) > TickCount() ) { itsColorLibrary->GetColor( itsMatchingCurrent, &matchColor.color );

if ( matchColor.color.preferredSpace != LcColorSpaceEmpty ) {
                deltaE = LcDeltaE( &itsColorToMatch.XYZ, &matchColor.color.XYZ );

if ( deltaE <= cmcTolerance ) {
                    matchColor.deltaE = deltaE;
                    itsMatchedColors->Append( &matchColor );
                }
            }
            itsMatchingCurrent++;
        }
    }

// blink marker
    itsIdleMarker = !itsIdleMarker;

if ( itsMatchingCurrent >= itsMatchingMax ) {
        itsIsMatching = LsFalse;
        itsMatchesAreValid = LsTrue;
        BeginDraw();
        displayMatches(LsTrue);
        EndDraw();
    }
    else {
        BeginDraw();
        DrawItem( FtUiMatchItemHeader );
        EndDraw();
    }
}

/* -------------------------------------------------------------------
 * displayMatches - sort and display the found matches
 *
 * displayMatches is called by idleMatching when all matching has completed.
 *
```

APPENDIX I                                                    Page 36

```
 * (-> input param, <- output param, <-> i/o param)
 *
 * update        -> if true, force redraw
 * ---------------------------------------------------------------------------
 */
void
FtUiMatch::displayMatches( LsBoolean update )
{
    if ( itsIsMatching || !itsMatchesAreValid )
        return;

// Sort itsMatchedColors according to deltaEs.
    {
        FtMatchColorPointer matchedColors;

matchedColors = itsMatchedColors->LockTemporary();

qsort( matchedColors, itsMatchedColors->GetLength(),
            sizeof( FtMatchColor ), compareColors );

itsMatchedColors->Unlock();
    }

// Remove duplicates
    if ( itsMatchedColors->GetLength() > 1 ) {
        FtMatchColor    previous, next;
        LsIndex         currentIndex = 0;

itsMatchedColors->Retrieve( currentIndex, &previous );
        while ( (currentIndex + 1) != itsMatchedColors->GetLength() ) {
            itsMatchedColors->Retrieve( currentIndex + 1, &next );
            if ( !strcmp( previous.color.name, next.color.name ) )
                itsMatchedColors->Remove( currentIndex + 1 );
            else {
                currentIndex++;
                previous = next;
            }
        }
    } itsSelectedItem = LsBadIndex;
    itsTopItem = 0;

SetCtlValue( itsScrollBar, itsTopItem );
    if ( itsMatchedColors->GetLength() < itsVisItems )
        SetCtlMax( itsScrollBar, 0 );
    else
        SetCtlMax( itsScrollBar,
                   itsMatchedColors->GetLength() - itsVisItems );

if ( update ) {
        Rect    paletteItemRect;

GetItemRect( FtUiMatchItemList, &paletteItemRect );
        // InsetRect( &paletteItemRect, 1, 0 );
        EraseRect( &paletteItemRect );

DrawItem( FtUiMatchItemHeader );
        DrawItem( FtUiMatchItemList );
    }
```

APPENDIX I                                                              Page 37

```
}
/* ---------------------------------------------------------------
 * populateColorLibraryMenu (OVERRIDE) - Populate popup menu with color library
 *                                      filenames in the specified directory
 *
 * (-> input param, <- output param, <-> i/o param)
 *
 * menu              -> popup menu
 * vRefNum           -> volume reference of color library directory
 * dirID             -> directory ID of color library directory
 * ---------------------------------------------------------------
 */
static LsInt16
populateColorLibraryMenu( MenuHandle menu, LsInt16 vRefNum, LsInt32 dirID )
{
    CInfoPBRec    pb;
    HFileInfo     *fpb = (HFileInfo *) &pb;
    LsInt16       index = 1;
    LsInt16       count = 0;
    LsPString     fileName;
    OSErr         err;

fpb->ioCompletion = (ProcPtr) LsNil;
    fpb->ioNamePtr    = fileName;
    fpb->ioVRefNum    = vRefNum;
    while ( LsTrue ) {
        fpb->ioDirID    = dirID;
        fpb->ioFDirIndex = index++;
        err = PBGetCatInfoSync( &pb );
        if ( err != noErr )
            break;
        if ( !(fpb->ioFlAttrib & 16)
          && fpb->ioFlFndrInfo.fdCreator == 'LfAP'
          && (fpb->ioFlFndrInfo.fdType == LcCLIBFileType
           || fpb->ioFlFndrInfo.fdType == LcEPSFFileType) ) {
            InsMenuItem( menu, (StringPtr) fileName, 255 );
            count++;
        }
    } return count;
}

/* ---------------------------------------------------------------
 * concatPStr - Concatenates two pascal strings
 *
 * (-> input param, <- output param, <-> i/o param)
 *
 * source         <-> source string
 * suffix          -> suffix string
 * ---------------------------------------------------------------
 */
static void
concatPStr( StringPtr source, const StringPtr suffix )
{
    LsUInt16    sourceLen, suffixLen;

sourceLen = source[0];
```

APPENDIX I                                              Page 38

```
    suffixLen = suffix[0];
    BlockMove( &suffix[1], &source[sourceLen + 1], suffixLen );
    source[0] += suffixLen;
}

// EOF
```

APPENDIX II                                                          Page 1

```
/*+
 *      File:       FtUiLigh.h
 *
 *      Contains:   FtUiLighting subclass (FtUiModel) which implements the
 *  user interface of
 *                  the Lighting Tool
 *
 *      Written by: Rob Cook
 *
 *      Copyright:  COPYRIGHT (C) 1993-94 by LIGHTSOURCE, INC.
 *                  *WORLDWIDE RIGHTS RESERVED*
 *
 *      Change History:
 *
 *              9/20/94    Ken      Added delta E display.
 *              08/15/94   AD       Override Receive() method
 *              08/02/94   AD       Update for changes in LcColor
 *              08/01/94   Eric     Declassify LcColor, causing renaming of
 *                                  everything and much anguish in
 *  general.
 *              06/08/94   RC       Removed obsolete items:
 *  SetEditTextItem() and lastItemSet.
 *              05/26/94   AD       Override DrawPopupMenuItem() and
 *  DoPopupMenu()
 *                                  to implement custom light source
 *  popup menu
 *              05/10/94   RC       Remember last set item.
 *              05/05/94   RC       Gave color elems meaningful names.
 *              04/25/94   AD       Updated for changes in CxDialog
 *              03/28/94   Eric  Use const
 *              03/01/94   AD       Added color patches
 *              02/15/94   AD       Changed type of 'LIGH' resource to
 *  'LSRC' to avoid
 *                                  conflict with owner resource
 *              02/15/94   RC       Added DoPopupMenuCommand(),
 *  SetPopupMenuItem(), SetColor()
 *                                  Added 'LIGH' resource.
 *              02/11/94   RC       Created.
 *
 *      To Do:
-*/ ifndef _H_FtUiLigh
define _H_FtUiLigh

/* -------------------------- Includes ------------------------------------ */ ifndef _H_Fantasia
include "Fantasia.h"
endif ifndef _H_FtUiMdl
include "FtUiMdl.h"
endif ifndef _H_LcColor
include "LcColor.h"
endif
```

APPENDIX II                              Page 2

```c
/* -------------------------- Defines ----------------------------------
- */ define    FtUiLightingLightSourceType    LsTargetToken( 'L', 'S', 'R', 'C' )

/* -------------------------- Declares ---------------------------------
- */ class FtUiLighting : public FtUiModel {
private:
        LcColor                         itsLightColor;
        LcColor                         itsSurfaceColor;
        LcColor                         itsResultColor;

CxFieldPointer                  itsDiffField;

// recalculate colors
        void                            recalculateColors( void );

// draw color difference
        void                            drawColorDifference( void );

protected:
        // Constructor
        void                            IFtUiLighting( void );

public:
        LsClassInternals( FtUiLighting )

// (OVERRIDE) process popup menu command
        virtual   void                  DoPopupMenuCommand( MenuHandle
popupMenu,
                                                        LsUInt16 item,
LsUInt16 menuItem );

// (OVERRIDE) draw a popup menu
        virtual   void                  DrawPopupMenuItem( LsInt16 item,
LsUInt16 depth );

// (OVERRIDE) click a popup menu
        virtual   void                  DoPopupMenu( LsInt16 item, Rect
*itemRect );

// (OVERRIDE) set popup menu associated with item
        virtual   void                  SetPopupMenuItem( LsInt16 item,
MenuHandle popupMenu );

// (OVERRIDE) set text edit item
        virtual   void                  SetEditTextItem( LsInt16 item,
CxFieldPointer field );

// (OVERRIDE) set color
        virtual   void                  SetColor( LcColorConstPointer
color );

// (OVERRIDE) can this item be dropped onto?
        virtual   LsBoolean             CanDropColorOnItem( LsInt16 item
);
```

APPENDIX II                                Page 3

```
     // {OVERRIDE} initialize color patches
     virtual     void           InitColorPatch( LsInt16 item,
CxColorPatchAttrs *attrs );

// {OVERRIDE} get/set patch colors
     virtual     void           GetPatchColor( LsInt16 item,
LcColorPointer color );
     virtual     void           SetPatchColor( LsInt16 item,
                                               LcColorConstPointer
color );

// {OVERRIDE} process changes sent by a provider model
     virtual void               Receive( LfModelPointer provider,
LfModelChangeToken aspectOfChange,
                                                LsPointer
object );

// initialize
     static FtUiLightingPointer    New( void );
};

#endif
```

APPENDIX II                                        Page 4

```
/*+
 *  File:       FtUiLigh.c
 *
 *  Contains:   FtUiLighting subclass (FtUiModel) which implements the user interface of
 *              the Lighting Tool
 *
 *  Written by: Rob Cook
 *
 *  Copyright:  COPYRIGHT (C) 1993-94 by LIGHTSOURCE, INC.
 *              *WORLDWIDE RIGHTS RESERVED*
 *
 *  Change History:
 *
 *      11/29/94    Ken     Added and commented out an alternative to
 *                          Compute delta E from Von Kries adapted
 *                          XYZ rather than from RGB in order to maintain
 *                          precision and get 0 with the same illuminant.
 *      9/28/94     Ken     Set default to D65 rather than F2.
 *      09/26/94    AD      Removed FtPublic
 *      09/20/94    Ken     Restored Von Kries adaptation.
 *                          Added delta E display.
 *                          Moved strings to resources.
 *      09/12/94    Ken     Recalculate XYZ using global illuminant after
 *                          setting the RGB.
 *                          Added disabled alternative to Do Von Kries, but
 *                          relative to the current global illuminant rather
 *                          than the Lighting Tool's illuminant.
 *      09/09/94    Eric    Make sure source field is set for all colors.
 *                          Sort lights by ID, not by name.
 *                          Don't do Von Kries for output patch...
 *      08/16/94    Eric    Param change for UIDrawColorPatch.
 *                          Fix potential problem in creation of XYZ
 *                          color: was not doing device RGB recalculation.
 *      08/15/94    AD      Override Receive() method
 *      08/02/94    AD      Update for changes in LcColor
 *      07/07/94    DJK     Split LcColor into public and private
 *                          interfaces.
 *      07/06/94    AD      Fix popup menu crash on second monitor
 *      06/09/94    RC      Desaturate light source RGBs instead of dimming them.
 *      06/08/94    RC      Change wording of several fields.  Disallow dragging into
result patch.
 *      06/02/94    AD      Center menu label; make sure menu appears on-screen
 *      05/26/94    AD      Override DrawPopupMenuItem() and DoPopupMenu()
 *                          to implement custom light source popup menu;
 *                          save default illuminant in preferences
 *      05/10/94    RC      New surface patch label: "Surface as seen under <Default
light>".
 *                          New result patch label: "Result as seen under <Specified
light>"
 *                          When dragging or broadcasting a non-spectral color into the
lighting tool,
 *                          the computed patch:
 *                              has its color set to gray
 *                              has its name set to "Spectral data unavailable."
 *                              is made non-draggable
 *      05/05/94    RC      Eliminate the spectral data of the result field.
 *                          Update internal spectral calculations for dragging
 *                          into result field.  Disable dragging into or out
 *                          of the light source patch.  Changed default light
```

APPENDIX II                                                Page 5

```
*                       source to D5000.  Gave color elems meaningful names.
*     04/25/94    AD    Updated for changes in CxDialog
*     03/28/94    Eric  Use const
*     03/18/94    RC    Don't call SpectrumToXYZ if the spectrum isn't valid!
*     03/18/94    RC    Dragging into the result field now works.  Made light and
*                       result fields not selectable.  Put names in created colors.
*     03/08/94    AD    Uses common resources
*     03/01/94    AD    Added color patches
*     02/25/94    RC    Fixed some bugs in the Lighting tool
*     02/25/94    RC    Fix bug in display of result color.
*                       Display names to the color patches.
*     02/21/94    AD    Changes in drag-and-drop interface.
*     02/17/94    RC    Fixed bug introduced with change to DragColorData.
*                       Added hack to set default popup menu item.
*     02/16/94    EMH   Akin changed DragColorData to FtUiModelDragData.
*     02/15/94    RC    Added light source popup.  Set surface to broadcast color.
*                       Add names to elems.
*     02/11/94    RC    Created.
*
* To Do:
-*/

/* ------------------------- Includes ---------------------------------- */ ifndef _H_Fantasia
include "Fantasia.h"
endif ifndef _H_LcPriv
include "LcPriv.h"
#endif
#ifndef _H_CtMsg
#include "CtMsg.h"
#endif
#ifndef _H_DvUiMdl
#include "DvUiMdl.h"
#endif
#ifndef _H_FtUiLigh
#include "FtUiLigh.h"
#endif
#ifndef _H_FtResComm
#include "FtResComm.h"
#endif
#ifndef _H_FuString
#include "FuString.h"
#endif
#ifndef _H_LfPref
#include "LfPref.h"
#endif
#ifndef _H_LsMath
#include "LsMath.h"
#endif
#ifndef _H_Ui
#include "Ui.h"
#endif
#ifndef _H_MacMisc
#include "MacMisc.h"
#endif
#ifndef _H_MdPref
```

APPENDIX II                                          Page 6

```c
#include "MdPref.h"
#endif

// ANSI
#include <stdio.h>
#include <string.h>

// TCL
include <Global.h>

/* -------------------------- Defines ---------------------------------- */ enum {
    FtUiLightingSurfaceColor = 1,
    FtUiLightingResultColor,
    FtUiLightingSurfaceLabel,
    FtUiLightingLightLabel,
    FtUiLightingResultLabel,
    FtUiLightingLightSource,
    FtUiLightingGraphic,
    FtUiLightingSeparator,
    FtUiLightingDiffLabel,
    FtUiLightingDiffField
};

#define FtUiLightingType        LsTargetToken( 'L', 'f', 'L', 'G' )
#define FtUiLightingIllumType   LsTargetToken( 'I', 'L', 'L', 'U' )

// Lighting strings resource ID
#define FtUiLightingStrID       502

// Lighting strings
enum {
    FtUiLightingStrLighting = 1,
    FtUiLightingStrDiffLuv,
    FtUiLightingStrDiffLab,
    FtUiLightingStrDiffCMC,
    FtUiLightingStrNoSpectrum
};

/* -------------------------- Declares --------------------------------- */ extern FtUiModelPointer     MakeTool( void );

EhDeclareFile

/* -------------------------- Routines --------------------------------- */

LsClassImplementation( FtUiLighting )

/* ---------------------------------------------------------------------
 * MakeTool - Make this tool
 *
 * The function instantiates this tool. It is not a member function so that
 * the caller of this function doesn't need to know where it is.
 *
 * (-> input param, <- output param, <-> i/o param)
 *
 * returns          <- this tool object
 *
```

APPENDIX II                                             Page 7

```
 * ---------------------------------------------------------------------------
 */
FtUiModelPointer
MakeTool( void )
{
    return FtUiLighting::New();
}

/* ---------------------------------------------------------------------------
 * New -    Allocate a FtUiLighting object
 *
 * The function does this, that and the other.  Then it does this again.
 *
 * (-> input param, <- output param, <-> i/o param)
 *
 * returns         <- A new object
 *
 * ---------------------------------------------------------------------------
 */
FtUiLightingPointer
FtUiLighting::New( void )
{
    FtUiLightingPointer tool;

if ( tool = new FtUiLighting )
        // Construction
        tool->IFtUiLighting();

return tool;
}

/* ---------------------------------------------------------------------------
 * IFtUiLighting -  Constructor
 *
 * (-> input param, <- output param, <-> i/o param)
 *
 * ---------------------------------------------------------------------------
 */
void
FtUiLighting::IFtUiLighting( void )
{
    // Superclass construction
    IFtUiModel();

activePatchItem = FtUiLightingSurfaceColor;
    itsDiffField = LsNil;
}

/* ---------------------------------------------------------------------------
 * SetColor (OVERRIDE) - Set color
 *
 * (-> input param, <- output param, <-> i/o param)
 *
 * color           -> color element pointer
 * ---------------------------------------------------------------------------
 */
void
```

APPENDIX II                                    Page 8

```
FtUiLighting::SetColor( LcColorConstPointer color )
{
    if ( activePatchItem ) {
        BeginDraw();
        SetPatchColor( activePatchItem, color );
        EndDraw();
    }
}

/* ---------------------------------------------------------------------
 * Receive (OVERRIDE) - process a message sent by a provider model
 *
 * (-> input param, <- output param, <-> i/o param)
 *
 * provider         -> source of the change message
 * aspectOfChange   -> change message
 * object           -> object to receive
 * ---------------------------------------------------------------------
 */
void
FtUiLighting::Receive( LfModelPointer provider,
                       LfModelChangeToken aspectOfChange,
                       LsPointer object )
{
    switch ( aspectOfChange ) {
    case DvUiModelMsgColorSpaceChanged:
        // Color tables actually changed. Recompute color values
        LcRecalculate( &itsSurfaceColor );

// Update color patches
        SetColor( (LcColorConstPointer) &itsSurfaceColor );
        break;

case MdPrefMsgDeltaESpaceChanged:
        drawColorDifference();
        break;
    }
}

/* ---------------------------------------------------------------------
 * Dispose (OVERRIDE) - Get rid of this object
 *
 * This method destroys the object.
 *
 * (-> input param, <- output param, <-> i/o param)
 *
 * ---------------------------------------------------------------------
 */
void
FtUiLighting::Dispose( void )
{
    LfPrefErr    err;
    LsInt16      illuminantIndex;

// Save default illuminant from preferences
    illuminantIndex = GetPopupMenuItemValue( FtUiLightingLightSource );

err = LfPreferences::SavePreference(
```

APPENDIX II                                              Page 9

```
        (LfPrefType) FtUiLightingType,
        (LfPrefType) FtUiLightingIllumType,
        0,
        (LsConstPointer) &illuminantIndex,
        sizeof(LsInt16) );

// Superclass destruction
    FtUiModel::Dispose();
}

/* ---------------------------------------------------------------------------
 * SetEditTextItem (OVERRIDE) - Set text edit item after it is loaded
 *
 * (-> input param, <- output param, <-> i/o param)
 *
 * item            -> item number
 * textEdit        -> text edit associated with this item
 * ---------------------------------------------------------------------------
 */
void
FtUiLighting::SetEditTextItem( short item, CxFieldPointer field )
{
    if ( item == FtUiLightingDiffField ) {
        itsDiffField = field;
        itsDiffField->SetText( " ", GetVisible() );
    }
}

/* ---------------------------------------------------------------------------
 * SetPopupMenuItem (OVERRIDE) - Set popup menu item after it is loaded
 *
 * (-> input param, <- output param, <-> i/o param)
 *
 * item            -> item number
 * popupMenu       -> popup menu associated with this item
 * ---------------------------------------------------------------------------
 */
void
FtUiLighting::SetPopupMenuItem( short item, MenuHandle popupMenu )
{
    LfPrefErr       err;
    LsInt16         illuminantIndex;

// Get lighting resources from common resource file
    FtResCommon::Open();
    AddResMenuSortByID( popupMenu, FtUiLightingLightSourceType );
    FtResCommon::Close();

// Get default illuminant from preferences
    err = LfPreferences::GetPreference(
        (LfPrefType) FtUiLightingType,
        (LfPrefType) FtUiLightingIllumType,
        0,
        LfReturnPrefOnly,
        (LsPointer) &illuminantIndex,
        sizeof(LsInt16),
        LsNil );

if ( err != noErr )
```

APPENDIX II                                            Page 10

```
        illuminantIndex = 5;    // The illuminant index for D65

// Set default illuminant in popup menu
    SetPopupMenuItemValue( item, illuminantIndex, LsTrue );
    DoPopupMenuCommand( popupMenu, item, illuminantIndex );
}

/* ---------------------------------------------------------------------------
 * DoPopupMenuCommand (OVERRIDE) - Process popup menu command
 *
 * (-> input param, <- output param, <-> i/o param)
 *
 * popupMenu         -> popup menu
 * item              -> item # of popup menu (baseitem already added)
 * menuItem          -> selected menu item
 * ---------------------------------------------------------------------------
 */
void
FtUiLighting::DoPopupMenuCommand( MenuHandle popupMenu, LsUInt16 item, LsUInt16
menuItem )
{
    FtResCommonData    data;
    LcColor            cLight;
    Str255             name;

GetItem( popupMenu, menuItem, name );
    data = FtResCommon::GetCommonNamedResource(
        FtUiLightingLightSourceType,
        (LsCharConstPointer) PtoCstr( name ) );

if ( data ) {

HLockHi( data );
        cLight = itsLightColor;
        LcPriv::LoadNamedIlluminantIntoElem( (LsCharConstPointer) *data,
            &cLight );
        HUnlock( data );

LcSetName( &cLight, (LsCharConstPointer) name );
        itsLightColor = cLight;

recalculateColors();
        DrawItem( FtUiLightingResultColor );
        drawColorDifference();

DisposeHandle( data );
    }
#if LsFlagDebug
    else
        DebugStr( "\pCouldn't load light source resources!" );
#endif
}

/* ---------------------------------------------------------------------------
 * DrawPopupMenuItem (OVERRIDE) - Draws popup menu item
 *
 * (-> input param, <- output param, <-> i/o param)
 *
```

APPENDIX II                                Page 11

```
 *   item            -> item number
 *   depth           -> screen depth
 * ---------------------------------------------------------------------------
 */
void
FtUiLighting::DrawPopupMenuItem( short item, LsUInt16 depth )
{
    MenuHandle      popupMenu;                      // popup menu's menu handle
    RGBColor        saveForeRGB, saveBackRGB;       // saved colors
    RGBColor        macRGB, triangleColor;          // menu colors
    PolyHandle      triangle;                       // menu triangle
    LsInt16         triangleX, triangleY;           // menu triangle coordinates
    LsUInt32        nameLength;                     // light source name
    LsInt16         nameWidth;                      // width of light source name
    Rect            itemRect;                       // menu rectangle
    LcXYZColor      lightXYZ;                       // light color in XYZ
    LcRGBColor      lightRGB;                       // light color in RGB
    LsDouble        r, g, b, min;                   // floating point components for light
source color if ( popupMenu = GetPopupMenuItem( item ) ) {
        // remember current colors
        GetForeColor( &saveForeRGB );
        GetBackColor( &saveBackRGB );

// get menu's enclosing rectangle
        GetItemRect( item, &itemRect );

// frame the light source menu
        UIDrawRaisedFrame( &itemRect, depth );
        InsetRect( &itemRect, 1, 1 );

/* Draw the light source patch.  This is a little tricky because if we do this
in
         * the usual way, the light source colors sometimes end up very dark in some
components.
         * We artificially desaturate the light source RGB to avoid this problem.  To do
this, we
         *      - get the light source color in XYZ
         *      - convert to RGB
         *      - find the min component
         *      - desaturate the color so that the min component is at least 200.
         *      - convert to Mac RGB
         */
        lightXYZ = itsLightColor.XYZ;
        LcXYZToRGBDouble( &lightXYZ, &r, &g, &b );
        min = LsMathMin3( r, g, b );
        if ( min < 200 ) {
            LsDouble scaleFactor;
            scaleFactor = ( 255 - 200 ) / ( 255 - min );
            r = 255.0 - ( 255.0 - r ) * scaleFactor;
            g = 255.0 - ( 255.0 - g ) * scaleFactor;
            b = 255.0 - ( 255.0 - b ) * scaleFactor;
        }
        lightRGB.red   = r;
        lightRGB.green = g;
        lightRGB.blue  = b;
        LcPixelRGBToMacRGB( &lightRGB, &macRGB );
        RGBBackColor( &macRGB );
        EraseRect( &itemRect );
```

APPENDIX II                                                    Page 12

```
        // determine the color in which to draw text
        UIGetTextColor( &macRGB, &triangleColor );
        RGBForeColor( &triangleColor );

// draw the light source label
        itemRect.right -= 12;
        itemRect.left += 12;
        nameLength = strlen(itsLightColor.name);
        nameWidth = TextWidth( (Ptr) itsLightColor.name, 0, nameLength );
        if ( nameWidth >= (itemRect.right - itemRect.left) ) {
            TextBox( (Ptr) itsLightColor.name, nameLength, &itemRect, teCenter );
        } else {
            FontInfo    fInfo;
            LsInt16     x, y;

GetFontInfo( &fInfo );
            x = ( itemRect.left + itemRect.right - nameWidth ) / 2;
            y = ( itemRect.top + itemRect.bottom - fInfo.ascent - fInfo.descent ) / 2;
            MoveTo( x, y + fInfo.ascent - fInfo.descent );
            DrawText( (Ptr) itsLightColor.name, 0, nameLength );
        }
        itemRect.right += 12;

// draw the menu "triangle"
        triangleX = itemRect.right - 8;
        triangleY = (itemRect.top + itemRect.bottom - 4)/2;

if ( triangle = OpenPoly() ) {
            MoveTo( triangleX, triangleY + 4 );
            LineTo( triangleX + 4, triangleY );
            LineTo( triangleX - 4, triangleY );
            LineTo( triangleX, triangleY + 4 );
            ClosePoly();
            PaintPoly( triangle );
            KillPoly( triangle );
        }

// restore colors
        RGBForeColor( &saveForeRGB );
        RGBBackColor( &saveBackRGB );
    }
}

/* -------------------------------------------------------------------------
 * DoPopupMenu (OVERRIDE) - Process mousedown event in popup-menu
 *
 * (-> input param, <- output param, <-> i/o param)
 *
 * item              -> item in dialog which was hit
 * itemRect          -> item rectangle
 * -------------------------------------------------------------------------
 */
void
FtUiLighting::DoPopupMenu( short item, Rect *itemRect )
{
    MenuHandle  popupMenu = GetPopupMenuItem( item );
    Point       itemHit, menuTopLeft, globalPt;
    long        menuResult;
```

APPENDIX II                                              Page 13

```
    short       menuItem;
    FontInfo    fInfo;
    GDHandle    screen;
    Rect        screenRect;

BeginDraw();

// mark the currently chosen menu item with a bullet character ('•')
    menuItem = GetPopupMenuItemValue( item );
    SetItemMark( popupMenu, menuItem, '•' );
    InsertMenu( popupMenu, hierMenu );

// get font information
    GetFontInfo( &fInfo );

// determine the location of the mouseclick
    itemHit = GetItemHit();
    globalPt = itemHit;
    LocalToGlobal( &globalPt );

// determine the location for drawing the menu
    menuTopLeft.h = itemRect->left + 4;
    menuTopLeft.v = itemHit.v - (fInfo.ascent + fInfo.descent)/2;
    LocalToGlobal( &menuTopLeft );

// make sure the left side of the menu stays on the monitor
    screen = GetDeviceList();
    while ( screen ) {
        screenRect = (**(**screen).gdPMap).bounds;
        if ( PtInRect( globalPt, &screenRect ) ) {
            if ( menuTopLeft.h < screenRect.left + 4 )
                menuTopLeft.h = screenRect.left + 4;
            break;
        }
        screen = GetNextDevice( screen );
    }

// pop up the menu
    menuResult = PopUpMenuSelect( popupMenu,
                                  menuTopLeft.v,
                                  menuTopLeft.h,
                                  menuItem );
    DeleteMenu( (**popupMenu).menuID );
    CheckItem( popupMenu, menuItem, FALSE );

// if the menu's value has changed, update the menu
    if ( HiWord( menuResult ) && LoWord( menuResult ) != menuItem ) {
        SetPopupMenuItemValue( item, LoWord( menuResult ), LsTrue );
        DrawItem( item );
        DoPopupMenuCommand( popupMenu, item, LoWord( menuResult ) );
    }

EndDraw();
}

/* ---------------------------------------------------------------------------
 * CanDropColorOnItem (OVERRIDE) - Can an item can be the recipient of a
 *                                 dragged color?
 *
```

APPENDIX II                                    Page 14

```
 * (-> input param, <- output param, <-> i/o param)
 *
 * item            -> dialog item
 * returns         <- whether item can receive a dragged color
 * ---------------------------------------------------------------------------
 */
LsBoolean
FtUiLighting::CanDropColorOnItem( short item )
{
    if ( item == FtUiLightingSurfaceColor )
        return LsTrue;
    else
        return LsFalse;
}

/* ---------------------------------------------------------------------------
 * InitColorPatch (OVERRIDE) - Initialize a color patch after it is loaded
 *
 * (-> input param, <- output param, <-> i/o param)
 *
 * item            -> item number
 * attrs           <-> color patch attributes
 * ---------------------------------------------------------------------------
 */
void
FtUiLighting::InitColorPatch( short item, CxColorPatchAttrs *attrs )
{
    switch( item ) {
    case FtUiLightingSurfaceColor:
        attrs->drawBorder   = 1;
        attrs->drawName     = 1;
        attrs->canDrag      = 1;
        attrs->canSelect    = 1;
        attrs->broadcast    = 1;
        attrs->paletteEntry = -1;
        break;
    case FtUiLightingResultColor:
        attrs->drawBorder   = 1;
        attrs->drawName     = 1;
        attrs->canDrag      = 1;
        attrs->canSelect    = 0;
        attrs->broadcast    = 1;
        attrs->paletteEntry = -1;
        break;
    }
}

/* ---------------------------------------------------------------------------
 * GetPatchColor (OVERRIDE) - Get the color for this color patch
 *
 * (-> input param, <- output param, <-> i/o param)
 *
 * item            -> patch item number
 * color           <- color for this patch
 * ---------------------------------------------------------------------------
 */
void
FtUiLighting::GetPatchColor( short item, LcColorPointer color )
{
```

APPENDIX II                                          Page 15

```
        switch( item ) {
        case FtUiLightingSurfaceColor:
            LcCopy( &itsSurfaceColor, color );
            break;
        case FtUiLightingResultColor:
            LcCopy( &itsResultColor, color );
            break;
        }
}

/* ---------------------------------------------------------------------
 * SetPatchColor (OVERRIDE) - Set the color for this color patch
 *
 * (-> input param, <- output param, <-> i/o param)
 *
 * item             -> patch item number
 * color            -> color for this patch
 * ---------------------------------------------------------------------
 */
void
FtUiLighting::SetPatchColor( short item, LcColorConstPointer color )
{
    LsDebugAssert( MetaFtUiLighting, item == FtUiLightingSurfaceColor );

LcCopy( color, &itsSurfaceColor );

recalculateColors( );

if ( GetVisible() ) {
        DrawItem( FtUiLightingSurfaceColor );
        DrawItem( FtUiLightingResultColor );
        drawColorDifference();
    }
}

/* ---------------------------------------------------------------------
 * recalculateColors - Recalculate colors
 *
 * (-> input param, <- output param, <-> i/o param)
 *
 * ---------------------------------------------------------------------
 */
void
FtUiLighting::recalculateColors( void )
{
    LcColor             cLight, cResult;
    LcIlluminantCoeffs  saveLightCoeffs;
    RGBColor            backMacColor;
    CxColorPatchAttrs   attrs;

cLight = itsLightColor;
    cResult = itsSurfaceColor;

CxDialog::GetPatchAttributes( FtUiLightingResultColor, &attrs );

if ( LcIsSpectrumValid( &cLight )
      && LcIsSpectrumValid( &itsSurfaceColor ) ) {
        LcXYZColor  xyz;
```

APPENDIX II                                    Page 16

```
        LcRGBColor   rgb;

/* Calculate the surface XYZ under the new light.  To do this:
         *      save the current light
         *      switch to the new light
         *      calculate the XYZ values using that light
         *      calculate RGB, the only non-illuminant specific space
         *      change the preferred space to RGB to indicate nonspectral data
         *      restore the current light
         */
        LcPriv::GetIlluminantCoeffs( &saveLightCoeffs );
//      newLightCoeffs = this->lightCoeffs;
        LcPriv::SetElemIlluminantCoeffs( &cLight );

#if 1
        // This scheme displays the color illuminated by the Lighting
        // Tool illuminant as seen by an observer adapted to the Lighting
        // Tool illuminant.

// ??? WARNING!!! This is hacky, so watch out for changes to fields in
        // LcColor.
        xyz = LcSpectrumToXYZ( &cResult.spectrum );
        rgb = LcXYZToRGB( &xyz );
        cResult.preferredSpace = LcColorSpaceRGB;
        cResult.preferred.RGB = rgb;
        LcCalculateDeviceRGB( &cResult );

LcPriv::SetIlluminantCoeffs( &saveLightCoeffs );

// Recalculate the XYZ with the global illuminant.
        LcRecalculate( &cResult );
#else
        // This scheme displays the color illuminated by the Lighting
        // Tool illuminant as seen by an observer adapted to the global
        // illuminant.

// Update the XYZ with the new Lighting Tool illuminant
        LcRecalculate( &cResult );

// Now switch the illuminant back and calculate the RGB
        LcPriv::SetIlluminantCoeffs( &saveLightCoeffs );

// This calculates the RGB from the XYZ we just calculated with
        // the other illuminant.  This way the RGB is calculated from
        // an XYZ that used the Lighting Tool illuminant, but the XYZ to
        // RGB transformation uses Von Kries adaptation from the current
        // global illuminant space to the monitor's white point defined
        // in the Colorsync system profile.  This is important to make
        // a color in the Lighting Tool look the same when the illuminant
        // is set to match the global illuminant (and they don't match
        // the monitor's white point).
        // The purpose of the lighting tool is to: "Show how a color will
        // look when illuminated by the Lighting Tool's illuminant as seen
        // by an observer who is adapted to the current global illuminant."
        LcGetRGB( &cResult, &cResult.preferred.RGB );

// Now set the preferred space to RGB so the screen appearance
        // doesn't change.  This way the XYZ won't be recalculated with
        // the global illuminant, which would create a change in the RGB.
        cResult.preferredSpace = LcColorSpaceRGB;
```

APPENDIX II                                        Page 17

```
            // Now that we've set the preferred space and it's value, we should
            // update the device RGB.
            LcCalculateDeviceRGB( &cResult );

#endif
        // Get lighting name from resource.
        {
            Str63       lightingName;

// get default Lighting color string ("\pLighting")
            GetIndString( lightingName, FtUiLightingStrID, FtUiLightingStrLighting );
            p2cstr( lightingName );

LcSetName( &cResult, (LsCharPointer)lightingName );
        }
        attrs.canDrag   = 1;
        attrs.broadcast = 1;
    } else {
        /* If there is no spectral data, we don't allow the operation:
         *      Gray out the result patch
         *      Set the name of the result patch to "No spectral data"
         *      Make the result patch not draggable
         */
        GetBackColor( &backMacColor );
        LcMacRGBToColor( &backMacColor, &cResult );

// Get "No spectral data" from resource.
        {
            Str63       lightingName;

// get default Lighting color string ("\pNo spectral data")
            GetIndString( lightingName, FtUiLightingStrID, FtUiLightingStrNoSpectrum );
            p2cstr( lightingName );

LcSetName( &cResult, (LsCharPointer)lightingName );
        }
        attrs.canDrag   = 0;
        attrs.broadcast = 0;
    }
    itsResultColor = cResult;
    CxDialog::SetPatchAttributes( FtUiLightingResultColor, &attrs );
}

/* ---------------------------------------------------------------------------
 * drawColorDifference - Draw the delta E between the surface and result colors
 *
 * (-> input param, <- output param, <-> i/o param)
 *
 * ---------------------------------------------------------------------------
 */
void
FtUiLighting::drawColorDifference( void )
{
    LsDouble    deltaE;
    LsChar      deltaEString[256];
    LsChar      deltaESpace[256];
    LsInt16     index = 0;

if ( LcIsSpectrumValid( &itsLightColor )
```

APPENDIX II                               Page 18

```
        && LcIsSpectrumValid( &itsSurfaceColor ) ) {
#if 0   // Calculate the XYZ without going through RGB in order to maintain precision.
        LcXYZColor   resultColorXYZ;

// Figure out the result color under the illuminant and then Von Kries
        // adapted to the global illuminant.
        {
            LcColorTablePointer info = (LcColorTablePointer)LcGetContext();
            LcIlluminantCoeffs  saveLightCoeffs;
            LcColor             cLight, cResult;
            LcXYZColor          xyz, globalWhite, lightWhite;

cLight = itsLightColor;
            cResult = itsSurfaceColor;
            globalWhite = info->illumXYZ;

// Save the global illuminant
            LcPriv::GetIlluminantCoeffs( &saveLightCoeffs );
            // Temporarily set the lighting illuminant
            LcPriv::SetElemIlluminantCoeffs( &cLight );
            xyz = LcSpectrumToXYZ( &cResult.spectrum );
            lightWhite = info->illumXYZ;
            // Restore the global illuminant.
            LcPriv::SetIlluminantCoeffs( &saveLightCoeffs );

LcVonKriesAdapt( &xyz, &resultColorXYZ, &lightWhite, &globalWhite );
        }

// This delta E is comparing the colors under the global illuminant.
        deltaE = LcDeltaE( &itsSurfaceColor.XYZ, &resultColorXYZ );
#else
        // This delta E is comparing the colors under the global illuminant.
        // The result patch XYZ is computed in the global illuminant by
        // recalculateColors() which uses the prefered space of RGB to start.
        deltaE = LcDeltaE( &itsSurfaceColor.XYZ, &itsResultColor.XYZ );
endif if ( itsDiffField && FuDoubleToString( deltaE, 3, deltaEString ) ) { switch( LcGetDeltaESpace() ) {
            case LcColorSpaceLuv:
                index = FtUiLightingStrDiffLuv;
                break;
            case LcColorSpaceLab:
                index = FtUiLightingStrDiffLab;
                break;
            case LcColorSpaceCMC:
                index = FtUiLightingStrDiffCMC;
                break;
            }
            if ( index ) {
                GetIndString( (StringPtr) deltaESpace, FtUiLightingStrID, index );
                PtoCstr( (StringPtr) deltaESpace );
                strcat( deltaEString, deltaESpace );
            }
            itsDiffField->SetText( deltaEString, GetVisible() );
        }
    }
    else if ( itsDiffField ) {  // Not a valid comparison, so clear the field.
```

APPENDIX II
Page 19

```
        itsDiffField->SetText( " ", GetVisible() );
    }
}

// EOF
```

We claim:

1. In an appropriately programmed digital computer, a method of matching colors comprising the steps of:
   acquiring a digital representation of a target color;
   choosing a color difference tolerance;
   selecting a color library from a plurality of pre-set color libraries, wherein said selected color library contains a plurality of digital color representations;
   computing a color difference between said target color and each color of said selected color library;
   comparing said color difference for each color of said selected color library to said color difference tolerance; and
   providing each color of said color library in which said color difference between said color and said target color is less than said color difference tolerance.

2. The method of claim 1, wherein said plurality of color libraries includes at least one pre-defined color library and at least one user-defined library.

3. The method of claim 1, wherein said acquiring step is performed using a spectrophotometer.

4. The method of claim 1, wherein said acquiring step is performed using a calorimeter.

5. The method of claim 1, wherein said providing step is performed using a monitor.

6. The method of claim 1, further comprising the step of providing a total number of color matches in which the difference between said color and said target color is less than the color difference tolerance.

7. The method of claim 1, wherein said target color and each color of said selected color library is in the form of a spectral data.

8. The method of claim 7, wherein said spectral data is transmittance data.

9. The method of claim 7, wherein said spectral data is reflectance data.

10. The method of claim 9, further comprising the following steps prior to said computing step:
    selecting an illuminant spectrum;
    adjusting said reflectance data for said target color and for each color of said selected color library to account for said illuminant spectra to produce a plurality of intensity spectra; and
    converting each of said intensity spectra to a CIE XYZ color space.

11. The method of claim 1, further comprising the steps of selecting a first illuminant and converting all colors within said selected color library and said target color to a first tristimulus color space based on said first illuminant, said selecting and converting steps occurring prior to said computing step.

12. The method of claim 11, wherein said tristimulus color space is a CIE XYZ color space.

13. The method of claim 11, wherein said tristimulus color space is a perceptually uniform color space.

14. The method of claim 11, wherein said tristimulus color space is a CIE Lab color space.

15. The method of claim 11, further comprising the steps of selecting a second illuminant and converting all colors within said selected color library and said target color from said first tristimulus color space to a second tristimulus color space, said second tristimulus color space based on said second illuminant, said selecting and converting steps occurring prior to said computing step.

16. In an appropriately programmed digital computer, a method of matching colors comprising the steps of:
    acquiring a digital representation of a target color;
    selecting a color library from a plurality of pre-set color libraries, wherein said selected color library contains a plurality of digital color representations;
    computing a color difference between said target color and each color of said selected color library; and
    providing a representation of said color from said selected color library having the smallest color difference.

17. In an appropriately programmed digital computer, a method of matching colors comprising the steps of:
    acquiring a digital representation of a target color;
    selecting a color library from a plurality of pre-set color libraries, wherein said selected color library contains a plurality of digital color representations;
    computing a color difference between said target color and each color of said selected color library;
    selecting a number of said colors of said color library to be provided;
    providing a representation of said number of said colors from said color library having the smallest color differences.

18. A digital computer system for color matching, comprising:
    a color sampling device, responsive to input light, for generating a spectral representation of a selected target color;
    a first writable memory for storing said spectral representation of said target color, said first writable memory coupled to a processor;
    a user interface coupled to said processor, wherein said user interface is capable of communicating a color difference tolerance to said processor;
    a plurality of color libraries stored in a second memory, wherein said second memory is non-volatile and coupled to said processor, each color library of said plurality of color libraries containing spectral representations of a plurality of individual colors, wherein one of said plurality of color libraries is selected by said processor, wherein said processor computes a color difference between said target spectral representation and each of said individual color spectral representations of said selected color library and compares each of said computed color differences with said color difference tolerance; and
    a display for communicating to a user a representation of each color of said selected color library for which the color difference is less than said color difference tolerance.

19. The digital computer system of claim 18, wherein said selection of said color library by said processor is based on instructions received by said processor from said user interface.

20. The digital computer system of claim 18, wherein said first writable memory and said second memory are the same.

21. In an appropriately programmed digital computer, a method of matching colors comprising the steps of:
    acquiring a digital representation of a target color;
    choosing a color difference tolerance;
    selecting a color library from a plurality of pre-set color libraries, wherein said selected color library contains a plurality of digital color representations;
    computing a color difference between said target color and each color of said selected color library;
    comparing said color difference for each color of said selected color library to said color difference tolerance;

providing each color of said color library in which said color difference between said color and said target color is less than said color difference tolerance, each provided color defining a match; and providing a total number of matches.

22. The method of claim 21, wherein said plurality of color libraries includes at least one pre-defined color library and at least one user-defined library.

23. The method of claim 21, further comprising the steps of selecting a first illuminant and converting all colors within said selected color library and said target color to a first tristimulus color space based on said first illuminant, said selecting and converting steps occurring prior to said computing step.

24. The method of claim 21, wherein said tristimulus color space is selected from the group consisting of a CIE XYZ color space, a perceptually uniform color space, and a CIE Lab Color space.

* * * * *

Disclaimer 5,798,943—Robert L. Cook, San Anselmo; Eric M. Herrmann, Larkspur; Nelson Offner, Kensington, all of Calif.; Edward M. Granger, Rochester, N.Y.; Akin Dirik; Lawrence D. Baca, both of San Francisco, Calif. APPARATUS AND PROCESS FOR A DIGITAL SWATCHBOOK. Patent dated Aug. 25, 1998. Disclaimer filed Aug. 1, 2003, by the assignee, Light Source Computer Images.

Hereby enters this disclaimer to claims 1-9, 16-22, and 24, of said patent.

*(Official Gazette, October 7, 2003)*